United States Patent [19]
Yamasaki et al.

[11] Patent Number: 5,547,382
[45] Date of Patent: Aug. 20, 1996

[54] RIDING SIMULATION SYSTEM FOR MOTORCYCLES

[75] Inventors: Gorou Yamasaki; Iseno Mitsuru, both of Saitama; Yukio Miyamaru, Tokyo, all of Japan

[73] Assignee: Honda Giken Kogyo Kabushiki Kaisha, Tokyo, Japan

[21] Appl. No.: 420,432

[22] Filed: Apr. 10, 1995

Related U.S. Application Data

[63] Continuation of Ser. No. 921,853, Jul. 29, 1992, abandoned, which is a continuation-in-part of Ser. No. 545,525, Jun. 18, 1990, abandoned.

[30] Foreign Application Priority Data

| Jul. 29, 1991 | [JP] | Japan | 3-188991 |
| Aug. 19, 1991 | [JP] | Japan | 3-207056 |
| Aug. 19, 1991 | [JP] | Japan | 3-207058 |

[51] Int. Cl.⁶ .................................... G09B 9/058
[52] U.S. Cl. .................. 434/61; 434/69; 434/307 R; 364/578; 273/442; 348/121; 345/8
[58] Field of Search ................. 434/55, 57, 61, 434/62, 69, 307 R, 308; 364/578; 273/85 G, 148 B, 442, DIG. 28; 348/779–782, 121; 350/98, 99; 345/8, 87

[56] References Cited

U.S. PATENT DOCUMENTS

| | | |
|---|---|---|
| 3,479,750 | 11/1969 | Swanson . |
| 3,488,861 | 1/1970 | Jones et al. ................ 434/69 |
| 3,686,776 | 8/1972 | Dahl ........................... 434/61 |
| 3,833,759 | 9/1974 | Yatabe et al. .............. 434/69 |
| 3,895,183 | 7/1975 | Collier ....................... 348/124 |
| 4,464,117 | 8/1984 | Foerst . |
| 4,578,710 | 3/1986 | Hasegawa ................. 348/782 |
| 4,752,836 | 6/1988 | Blanton et al. . |
| 4,760,388 | 7/1988 | Tatsumi et al. ............ 345/1 |
| 4,817,948 | 4/1989 | Simonelli .................. 434/63 X |
| 4,846,686 | 7/1989 | Adams ....................... 434/69 |
| 4,887,967 | 12/1989 | Letovsky et al. . |
| 4,918,535 | 4/1990 | Grabis et al. .............. 348/782 |
| 4,978,300 | 12/1990 | Letovsky et al. . |
| 5,006,072 | 4/1991 | Letovsky et al. . |
| 5,015,189 | 5/1991 | Wenzinger, Jr. ........... 434/63 |
| 5,090,909 | 2/1992 | Keller et al. .............. 348/121 X |
| 5,184,956 | 2/1993 | Langlais et al. .......... 434/69 |
| 5,209,662 | 5/1993 | Fujita et al. ............... 434/61 |
| 5,240,417 | 8/1993 | Smithson et al. ......... 434/61 |
| 5,261,820 | 11/1993 | Slye et al. ................. 434/307 R X |
| 5,269,687 | 12/1993 | Mott et al. ................. 434/69 |
| 5,354,202 | 10/1994 | Moncrief et al. ......... 434/69 |

FOREIGN PATENT DOCUMENTS

| | | |
|---|---|---|
| 0137110 | 4/1985 | European Pat. Off. . |
| 0183497 | 6/1986 | European Pat. Off. . |
| 0406729 | 1/1991 | European Pat. Off. . |
| 52-20538 | 9/1975 | Japan . |
| 51-24344 | 2/1976 | Japan . |
| 61-154689 | 7/1986 | Japan . |
| 62-1688 | 1/1987 | Japan . |
| 63-249885 | 10/1988 | Japan . |
| 1-232380 | 9/1989 | Japan . |
| 88/06776 | 9/1988 | WIPO . |

*Primary Examiner*—Joe Cheng
*Attorney, Agent, or Firm*—Lyon & Lyon

[57] ABSTRACT

A motorcycle riding simulation system including a model motorcycle operated and ridden upon by a person. Responsive to operation by the person riding, the model motorcycle is moved by a driven mount to pitch, yaw and roll to simulate riding conditions. A moving image such as scenery which would be seen from a running motorcycle is displayed in front of the person riding. The moving image is varied in response to driving conditions of the model motorcycle and is provided by a display with a curved screen. An image projector projects images on the curved screen from behind. The system is provided with an image recorder for recording both images displayed by the display and driving operation data. An output provides access to recorded information in the image recorder. A background image is reflected in the rear view mirrors of a two-wheeled simulation vehicle. The image is formed by a background image generator. Video signals fed from the background image generator are displayed as images by a background image display, whereby background images can be reflected in the rear view mirrors of the simulation vehicle.

1 Claim, 24 Drawing Sheets

INITIAL STATE

ACCELERATION

DECELERATION

UP/DOWN PITCHING MOVEMENT

FRONT-TIPPED STATE

REAR-TIPPED STATE

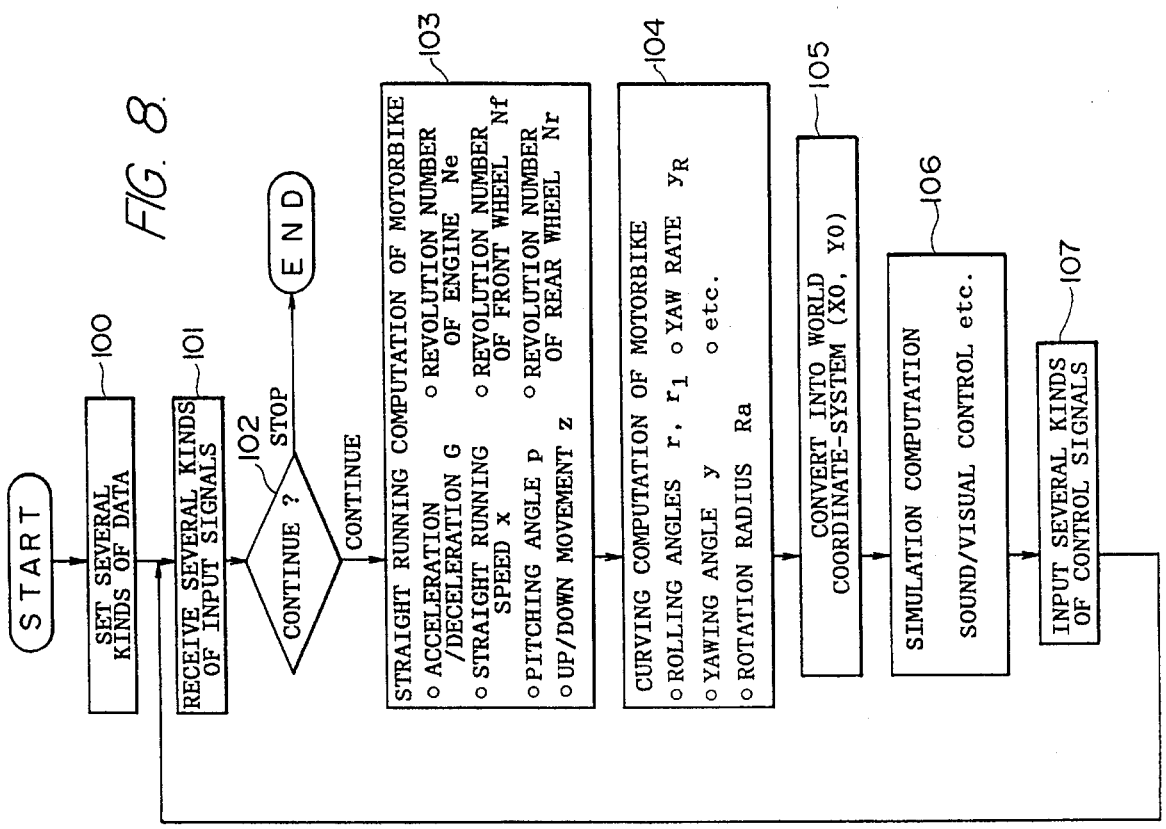
FIG. 8.
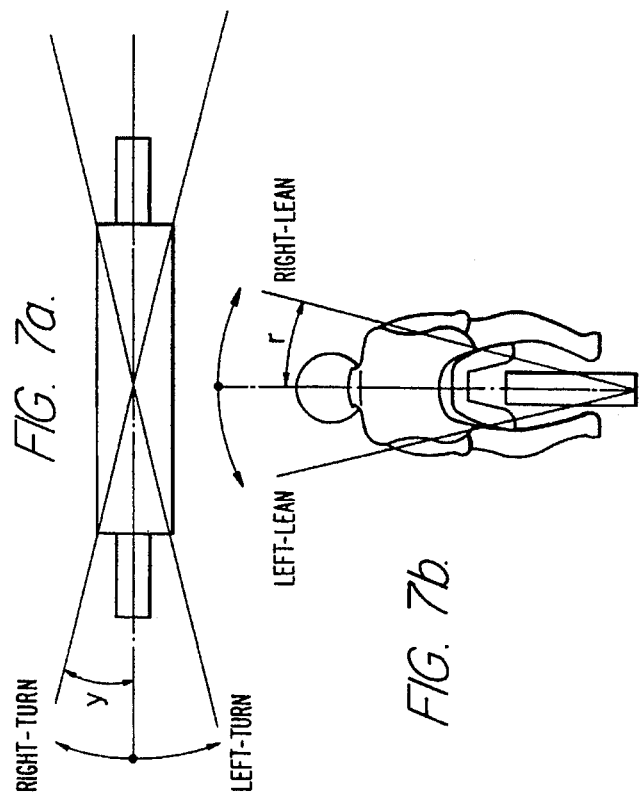
FIG. 7a.
FIG. 7b.
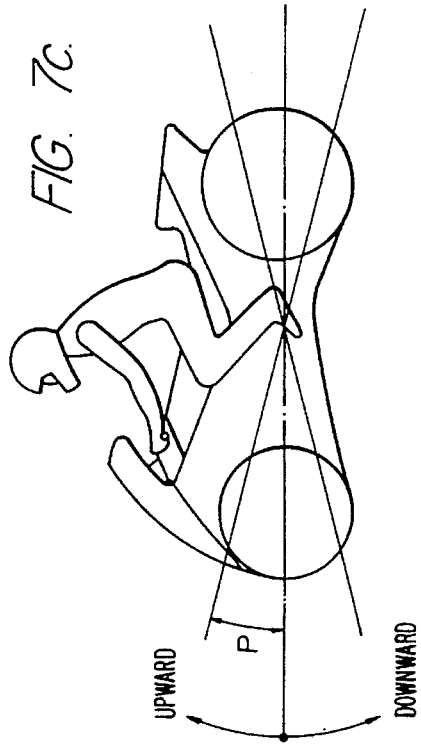
FIG. 7c.

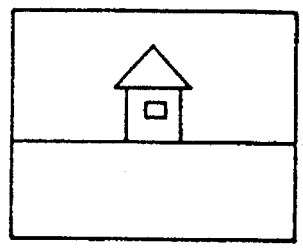
CONSTANT SPEED
FIG. 9a.
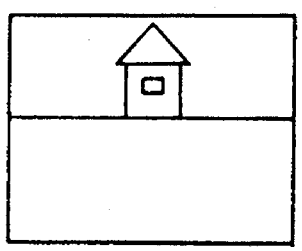
ACCELERATION
FIG. 9b.
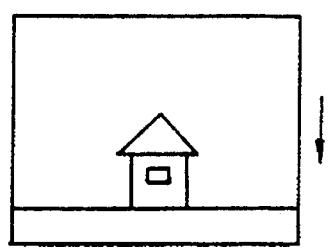
DECELERATION
FIG. 9c.
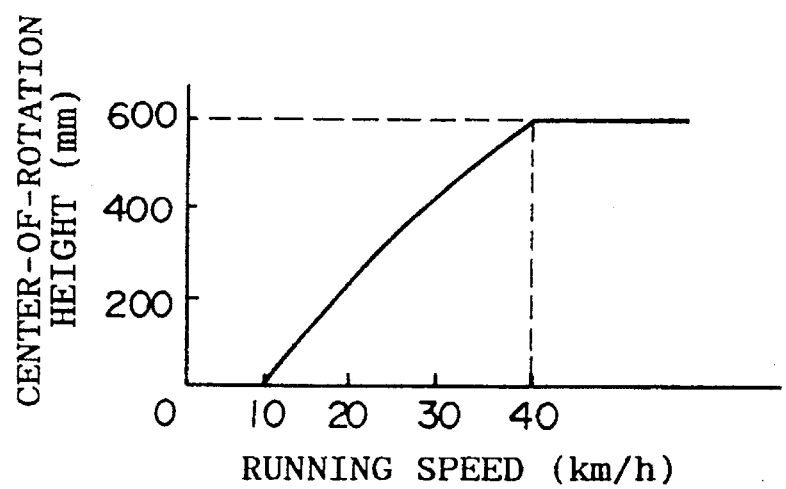
FIG. 11.
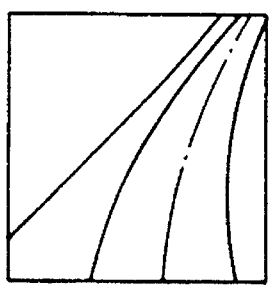
FIG. 12a.
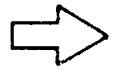
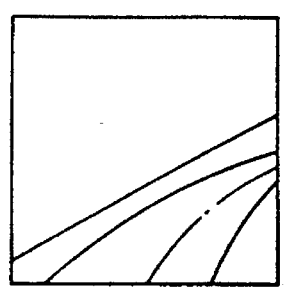
FIG. 12b.

INITIAL STATE

ACCELERATION

DECELERATION

UP/DOWN PITCHING MOVEMENT

FRONT-TIPPED STATE

REAR-TIPPED STATE

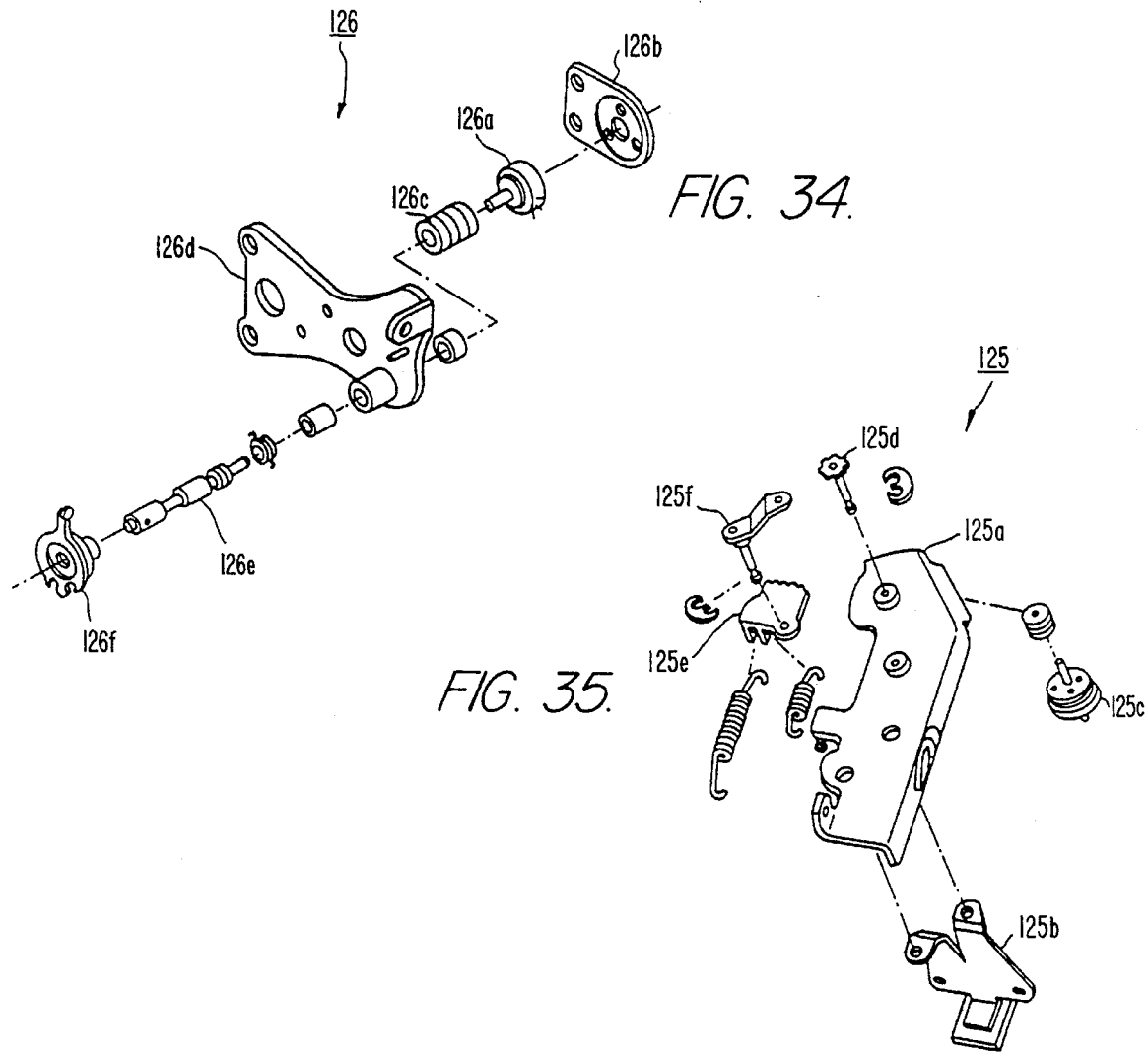
FIG. 34.
FIG. 35.
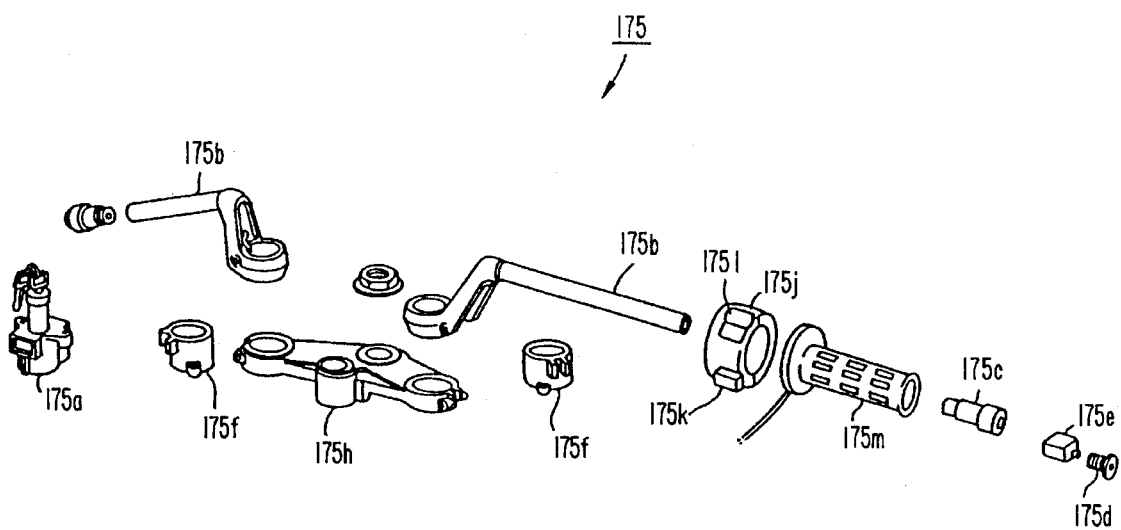
FIG. 36.

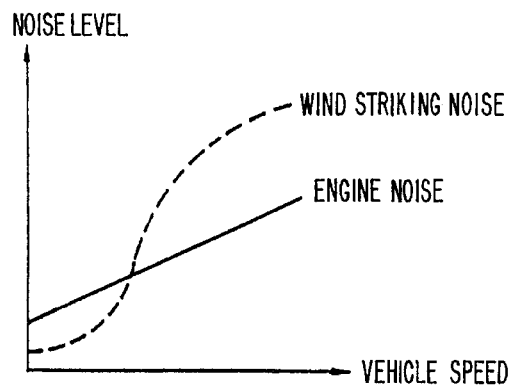
FIG. 40.
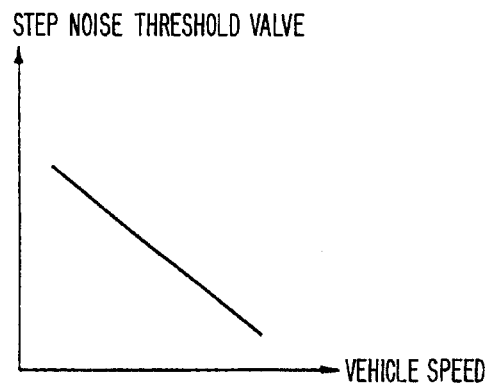
FIG. 41.
FIG. 42.
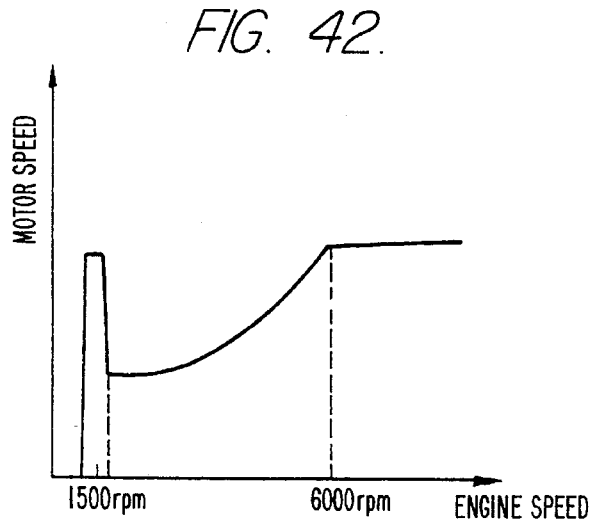
FIG. 43.
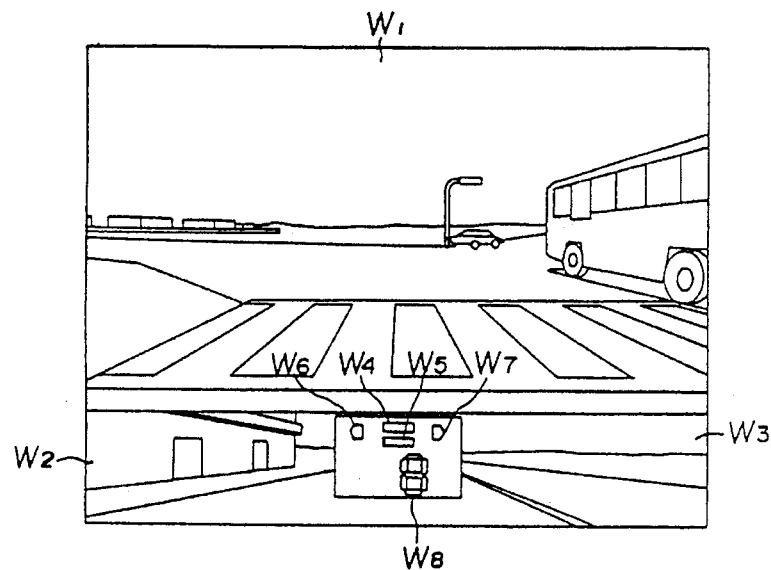

RIDING SIMULATION SYSTEM FOR MOTORCYCLES

This application is a continuation of application Ser. No. 07/921,853, filed Jul. 29, 1992, now abandoned, which is a continuation-in-part of application Ser. No. 07/545,525, filed Jun. 28, 1990, now abandoned.

BACKGROUND OF THE INVENTION

The field of the present invention is riding simulation systems for motorcycles which use an articulated motorcycle model upon which a person can ride and a display in a simulator structure.

Riding simulation systems have been known which are used for amusement and employ a model motorcycle and CRT display. By varying the display image, the game-player can enjoy the simulation of riding a motorcycle. In order to further improve the riding feeling, devices have been disclosed in Japanese Patent Laid-Open Publication No. 61-154689 and Japanese Utility Model Laid-Open Publication No. 62-1688 where the rider can freely lean the model motorcycle to the left and right.

In such riding simulation systems, the model motorcycle is designed to be leaned in response to variation of the center-of-gravity of the model motorcycle on which the rider rides. In general, when the rider intends to simulate a turn, the rider leans the motorcycle to one side so that the center-of-gravity of the rider and motorcycle is varied. However, the conventional system cannot simulate the actual riding feeling corresponding to a turn, acceleration and deceleration, running attitude of the motorcycle and the like.

Riding simulation systems have been developed in which a curved screen having a center on the simulation vehicle side and an image projecting means for projecting an image on the curved screen also from the simulation vehicle side, are used as the display means (see Japanese Patent Laid Open No. 51-24344). However, the above conventional simulation system has been developed for training how to pilot an airplane, so if it is applied directly to a two-wheeled vehicle, there may occur the following inconvenience. In the case of a two-wheeled vehicle, since the vehicle rolls, swings and pitches according to driving operations, the rider's body, particularly the rider's head, moves in the longitudinal, transverse and vertical directions and hence the light emitted from the image projecting device may be intercepted by the rider's head if these movements are included in the simulation.

A simulation system has also been developed in which a two-wheeled simulation vehicle and a CRT display are combined together with the image on the display screen variable in accordance with the operation of an accelerator handle, thereby contributing to the riding sense. A feature has also been developed where the rider's driving actions are recorded with time and operation data at any desired time point can be accessed (see Japanese Patent Laid Open No. 63-249885). However, only the rider's driving operation data are recorded and reproduced, so it is difficult for the rider to recall the driving condition at every moment and hence it is sometimes difficult for an instructor, for example, to give guidance to the rider after driving.

A simulation system has also been developed using a two-wheeled simulation vehicle and a CRT display combined together with an image on the display screen which is varied in accordance with the operation of an accelerator handle, thereby permitting the rider to enjoy a riding sense. In such a riding simulation system of this type there has been developed one in which the two-wheeled simulation vehicle can tilt in a transverse direction (rolling direction) in order to obtain a driving feeling closer to the actual one and enhance the realistic feeling of driving. Such a technique is disclosed in Japanese Patent Laid Open No. 61-154689 and Utility Model Laid Open No. 62-1688. In these riding simulation systems, the simulation of a running state is performed on the basis of images appearing on the screen of a display unit which is disposed in an opposed relation to a two-wheeled simulation vehicle. In using such riding simulation systems in training for driving two-wheeled vehicles, it is necessary to further simulate actual driving conditions. For example, using the above riding simulation systems to experience course change and overtaking, since images corresponding to such driving operations are not reflected in the back mirrors of the two-wheeled simulation vehicle, there has been a lacking in reality.

SUMMARY OF THE INVENTION

It is accordingly a primary object of the present invention to provide a riding simulation system which can simulate the riding feelings of a real vehicle with sufficient accuracy so that such a system can be used for driver education in addition to amusement.

In a first aspect of the present invention, a riding simulation system is presented using a simulation vehicle in which the light emitted from an image projecting device is not intercepted by the rider and images easily visible to the rider are obtained. To this end, a display disposed in front of the simulation vehicle in an opposed relation to the vehicle displays images of pre-recorded running scenes. A moving means for imparting simulated running behavior to the simulation vehicle and a control for controlling the display and the moving means in accordance with driving operations performed by the rider simulates running conditions. The display includes a curved screen having a center of curvature on the side where said simulation vehicle is present and an image projecting means for projecting an image on the curved screen from behind.

In a second aspect of the present invention, a vehicle riding simulation system is presented capable of reproducing driving conditions and the rider's driving operation continuously after driving to provide an effective training tool. The riding simulation system contemplated to this end has a simulation vehicle to be driven by a rider, a display means disposed in front of the two-wheeled simulation vehicle in an opposed relation to the vehicle to display images of pre-recorded running scenes in accordance with driving operations performed by the rider, a moving means for imparting simulative running behaviors to the simulation vehicle, and a control means for controlling the moving means in accordance with the driving operations to simulate running conditions. An image recording means for recording the images displayed by the display means and an output means for outputting the information recorded in the image recording means are used.

In a third aspect of the present invention, a riding simulation system uses a simulation vehicle in which images behind the vehicle corresponding to driving operations can be reflected also in the back mirrors of the vehicle. To this end, a background image generating means forms a background image to be reflected in a back mirror or mirrors of the simulation vehicle. The background image varies in accordance with the running scenes, and a background image display means provided in the simulation vehicle displays, as images, video signals fed from the background image generating means. A prerecorded image of another vehicle may additionally be superimposed.

Accordingly, it is an object of the present invention to provide an improved vehicle simulation system. Other and further objects and advantages will appear hereinafter.

BRIEF DESCRIPTION OF THE DRAWINGS

FIG. 7A–C shows the yawing, rolling and pitching movements of the model motorcycle;

FIG. 8 is a flow chart showing the computation processings which are executed by the computer shown in FIG. 6;

FIG. 9 shows display images which are controlled by the first embodiment;

FIG. 11 is a graph showing the relationship between the simulated running speed of motorcycle and center-of-rotation in the rolling movement;

FIG. 12 shows display images which are controlled by the first embodiment;

FIG. 34 is an exploded view for explaining a throttle sensor in the fourth embodiment;

FIG. 35 is an exploded view for explaining a clutch sensor in the fourth embodiment;

FIG. 36 is an exploded view showing the construction of a handle portion in the fourth embodiment;

FIG. 40 is a diagram showing a relation between a wind striking noise and an engine noise with varying vehicle speeds;

FIG. 41 is a diagram showing changes of a step noise threshold value with respect the vehicle speed;

FIG. 42 is a diagram showing changes in the number of revolutions of a motor for simulative vibration of the engine relative to the engine speed;

FIG. 43 is a diagram showings an example of printout made by a video printer;

DESCRIPTION OF THE PREFERRED EMBODIMENTS

Figure 1:
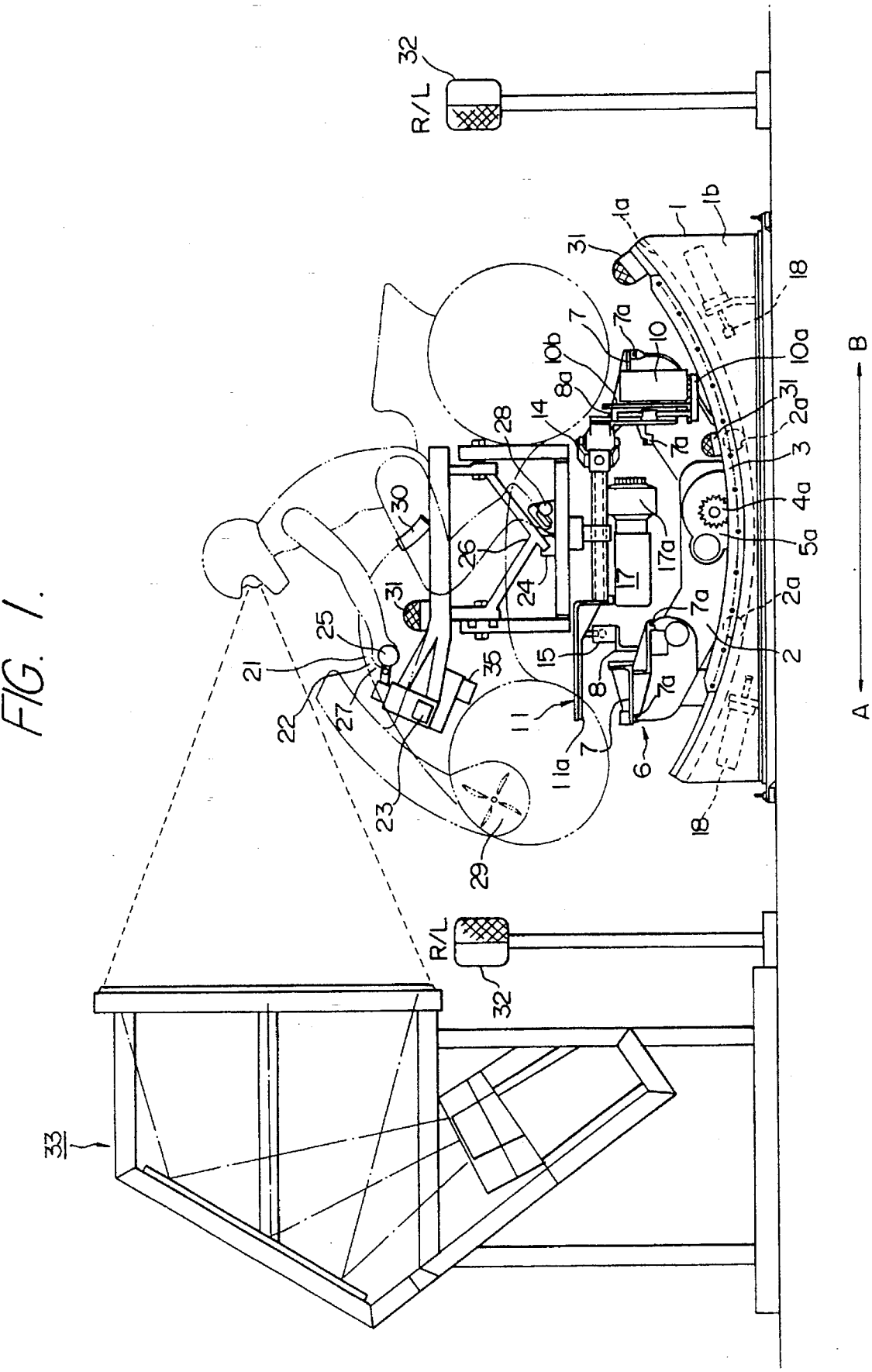
FIG. 1 is a side view showing the construction and mechanism of the riding simulation system for a motorcycle according to a first embodiment of the present invention.
Figure 2:
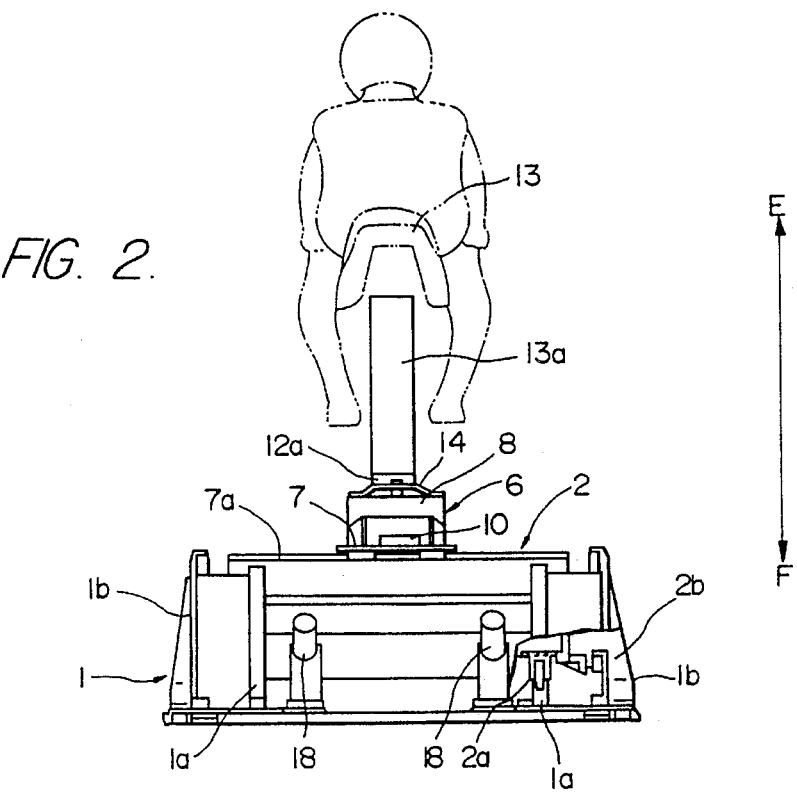
FIG. 2 is a backside view of the first embodiment.
Figure 3:
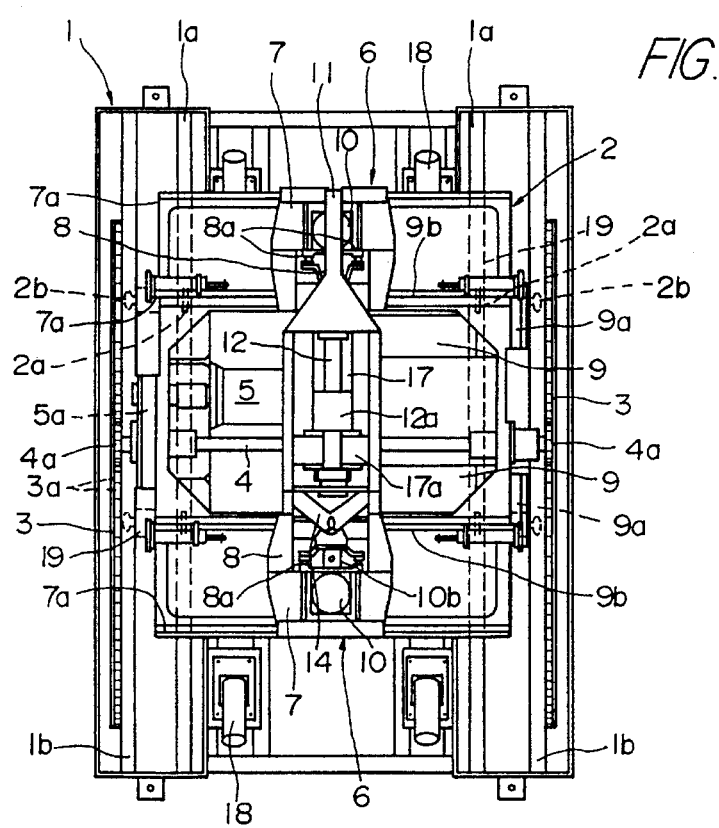
FIG. 3 is a plan view showing the first embodiment from which the model motorcycle is removed.

Referring now to the drawings, wherein like reference characters designate like or corresponding parts throughout the several views, FIGS. 1 to 4 show the mechanical construction of a motorcycle riding simulation system according to a first embodiment of the present invention.

In FIGS. 1 to 4, 1 designates a base, and 2 designates a mount including a movable carriage. Herein, the movable carriage 2 is supported by the base 1 in such a manner that the movable carriage 2 can freely move in forward and backward directions (i.e., directions AB in FIG. 1) by wheels 2a placed on a pair of guide-rails 1a formed on the base 1. Herein, both the base 1 and the movable carriage 2 are of symmetrical construction, therefore, description will be mainly given with respect to one side construction of the base 1 and movable carriage 2. In the base 1, each of two guide-plates 1b is positioned outside each guide-rail 1a. The longitudinal upper edge portion of each guide-plate 1b is curved so that the base 1 itself has a concave shape. Then, a guide-roller 2b is placed in contact with the upper edge portion of the guide-plate 1b. Further, each of two racks 3 along which a plurality of pins 3a are disposed fixed at the outside of the guide-plate 1b. In addition, a drive shaft 4 is placed inside the movable carriage 2, wherein a pair of pinions 4a engaging with the racks 3 are mounted at both edges of the drive shaft 4. The drive shaft 4 is driven by a motor 5 via a gear box 5a provided within the movable carriage 2 such that the drive shaft 4 can be rotated in forward and backward directions. Thus, the movable carriage 2 can be moved along the guide-rails 1a in forward and backward directions. The guide-rail 1a is curved such that both edges thereof are raised upwardly. Therefore, in response to the forward and backward movement of the movable carriage 2, the movable carriage 2 can be moved upwardly and downwardly (i.e., directions EF in FIG. 2) like a rocking chair, for example. Furthermore, a pair of movable mechanisms 6 are mounted at positions corresponding to the front and back ends of the model motorcycle 13 within the movable carriage 2, wherein each movable mechanism 6 functions independently to move the model motorcycle 13 in a lateral direction (i.e., directions CD in FIG. 2) and a vertical direction (i.e., directions EF in FIG. 2). More specifically, each movable mechanism 6 is constructed by a slide member 7, guide-rails 8a and an elevation frame 8. Herein, the slide member 7 can freely slide along a guide-rail 7a placed on the movable carriage 2 in a horizontal direction; the guide-rail 8a is fixed at the slide member 7; and the elevation frame 8 is supported by the guide-rail 8a in such a manner that the elevation frame 8 can freely move in upward and downward directions. In the movable carriage 2, a motor 9 is coupled to a ball screw 9b via a gear box 9a. By revolving the ball screw 9b forwardly and backwardly, the slide member 7 is moved rightward and leftward in FIG. 3. On the other hand, a motor 10 mounted on the slide member 7 is coupled to a ball screw 10b via a gear box 10a. By revolving the ball screw 10b forwardly and backwardly, the elevation frame 8 is moved upwardly and downwardly. Thus, the elevation frame 8 which functions as the moving part of each movable mechanism 6 can be moved in both of the lateral and vertical directions.

In order to reduce the production cost of the present embodiment, the movable portion of the above-mentioned movable carriage 2 can be omitted such that the non-movable portion of the movable carriage 2 and the base 1 are placed on the ground. In this case, the pitching movement of the model motorcycle 13 can be realized by the pitching movement of the elevation frame 8 which moves upwardly and downwardly along the guide-rails 8a.

Figure 4:
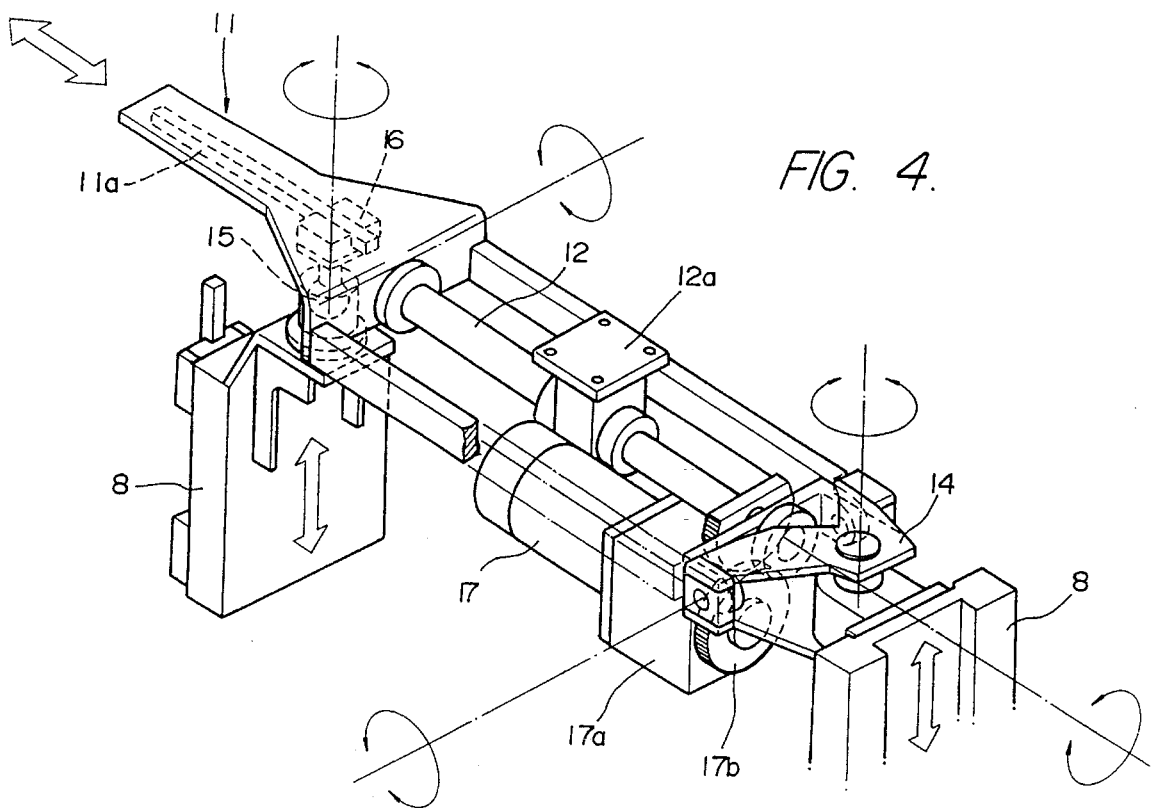
FIG. 4 is a perspective side view showing the support frame portion of the first embodiment.

Between the elevation frames 8 of the movable mechanisms 6 is a support frame 11 having an elongate shape. A rolling shaft 12 is provided through the support frame 11. This rolling shaft 12 supports the model motorcycle 13 such that the model motorcycle 13 can freely lean in a left-lean or right-lean direction. In FIG. 4, the backside edge of the support frame 11 is connected to the upper portion of the elevation frame 8 of the movable mechanism 6 corresponding to the backside of the model motorcycle 13 via a cross joint 14. The front side edge of the support frame 11 is connected to a linear guide 16 mounted on the upper portion of another elevation frame 8 via a ball joint 15. Herein, the linear guide 16 can freely slide along a guide-rail 11a mounted at the under surface of the front side edge of the support frame 11. Thus, in response to the movement of the elevation frame 8 of each movable mechanism 6 and because the linear glide 16 can freely slide, the support frame 11 can pitch and yaw. In addition, a motor 17 is provided under the rolling shaft 12 positioned at the center portion of the support frame 11. This motor 17 is coupled to the rolling shaft 12 via a reduction gear 17a and a gear 17b, so that the motor 17 can revolve the rolling shaft 12 slowly. Then, a frame 13a of the model motorcycle 13 is mounted on a cradle 12a fixed at the center portion of the rolling shaft 12.

Meanwhile, 18, 19 designate shock absorbers which regulate the moving ranges of the movable carriage 2 and the slide member 7 of each movable mechanism 6.

Next, the model motorcycle 13 is designed to simulate the actual motorcycle. In order to detect operations of the rider, several kinds of sensors which sense operations of the controls of the model motorcycle 13, for example, accelerator handle, brake, clutch, gear-changer, etc. and the center-of-gravity to be varied in response to the riding attitude of the rider are provided in the model motorcycle 13. As such sensors, the model motorcycle 13 provides an acceleration sensor 21, a clutch-lever-angle sensor 22, a handle torque sensor 23, a lean torque sensor 24, a front braking-pressure sensor 25 and a rear braking-pressure sensor 26. In order to simulate the actual driving situation, the model motorcycle 13 provides a gear position switch 28 and several kinds of handle switches 27 such as a riding switch, a dimmer switch, a winker switch, a starter switch, a horn switch, and a kill switch.

Figure 5A:
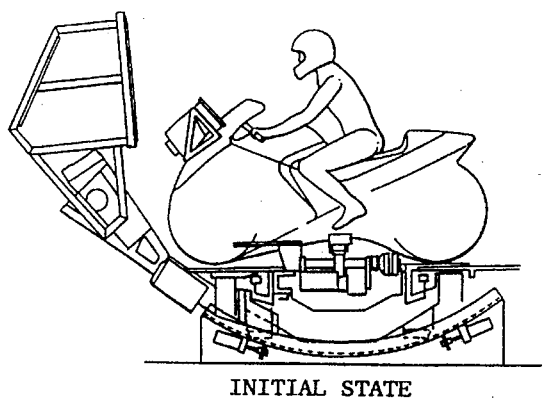
FIGS. 5A–F are side views showing movements of the model motorcycle according to the first embodiment.

In order to simulate the real riding situation with accuracy, the model motorcycle 13 further provides an electric fan 29, vibrators 30 and speakers 31. In order to reproduce the real driving situation with the display image and sounds, four speakers 32 (including two pairs of right-channel and left-channel, R/L, speakers) and a display unit 33. Herein, the speakers 32 are positioned at the front and back sides of the motorcycle 13, while the display unit 33 is positioned in front of the motorcycle 13. As shown in FIG. 1, the display unit 33 is provided apart from the base 1 and movable carriage 2. Instead, it is possible to attach the display unit 33 to the movable carriage 2 as shown in FIG. 5A. The arrangement and operation of the display unit 33 are designed such that the rider can easily watch the display image by moving the display screen in response to the movement of the motorcycle 13. Meanwhile, the output signals of the sensors described above are supplied to the computer, by which the display image is varied in response to the driving condition. In addition, by driving the motors 5, 9, 10, 17, the model motorcycle 13 is moved such that the rider can experience the riding operation similar to that of the real motorcycle.

Before describing the above-mentioned simulation control by the processor, diagrammatical description will be given with 10 respect to the whole operation of the present system.

Figure 5B:
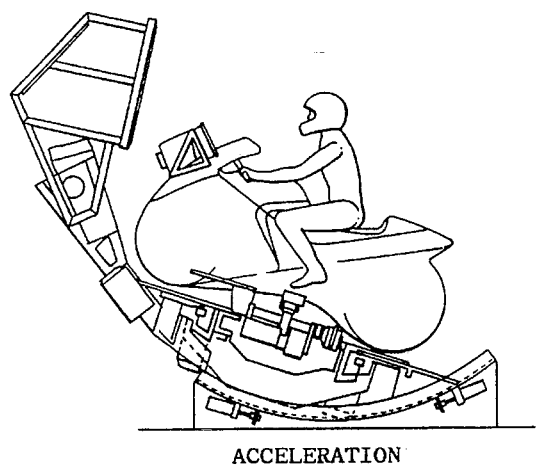
Figure 5C:
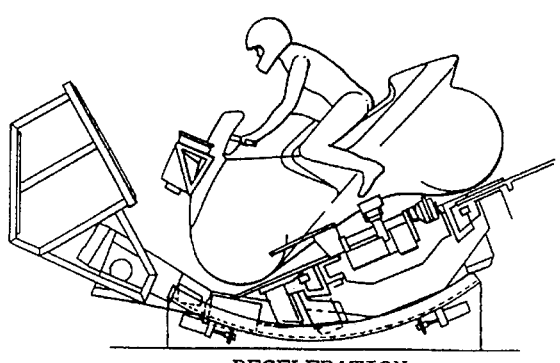

For example, when accelerating or decelerating the model motorcycle 13 by operating the accelerator or brake, the movable carriage 2 is moved in forward and backward directions so that the model motorcycle 13 is to be moved as shown in FIGS. 5B and 5C. In the present embodiment, the model motorcycle 13 is moved in forward and upward directions along with the curved guide-rails 1a when accelerating, while the model motorcycle 13 is moved in backward and upward directions when decelerating. Such movement of the model motorcycle 13 can give the rider the acceleration and deceleration feelings. When the display image shows that the motorcycle 13 will enter into a corner and the rider changes his riding attitude to thereby change the center-of-gravity, the motor 17 drives the rolling shaft 12 so that the motorcycle 13 is leaned toward the right-lean or left-lean direction. In addition, by driving the motors 9, 10 so that both of the slide member 7 and elevation frame 8 are moved, the model motorcycle 13 is elevated up in the direction of lean, resulting in the rider temporarily feeling the centrifugal force when cornering the motorcycle 13.

Figure 5D:
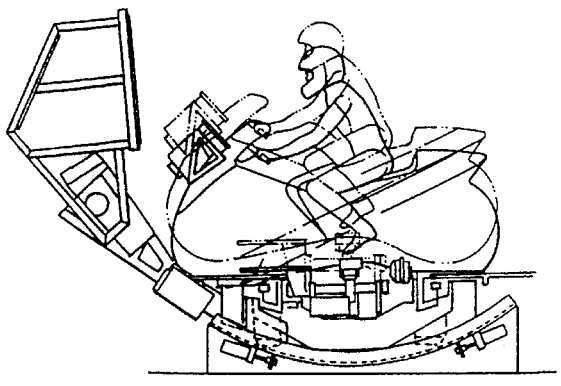
Figure 5E:
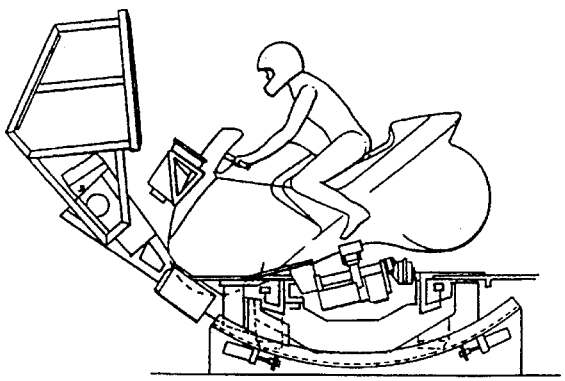
Figure 5F:
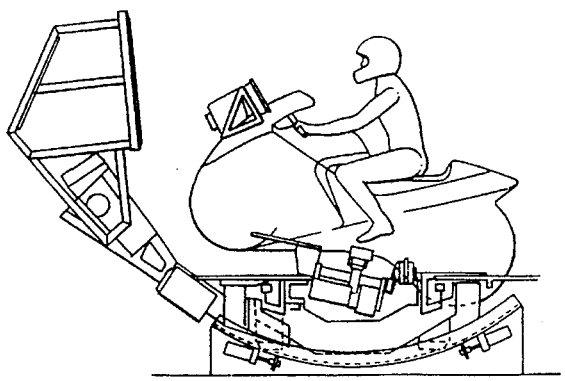

By moving one slide member 7 in a rightward direction while the other slide member 7 is moved in a leftward direction, the yawing can be applied to the model motorcycle 13. By independently moving the slide members 7 in rightward and leftward directions, the slipping of the front or rear wheel of the motorcycle 13 can be obtained. By moving the single elevation frame 8 of the movable mechanism 6 in an upward or downward direction, the cushion operation of the front or rear wheel of the motorcycle 13 can be embodied as shown in FIG. 5D. Further, as shown in FIGS. 5E, 5F, the motorcycle 13 can be controlled to be set in the front-tipped state and rear-tipped state.

Next, detailed description will be given with respect to the computer control by the processor of the present embodiment.

Figure 6:
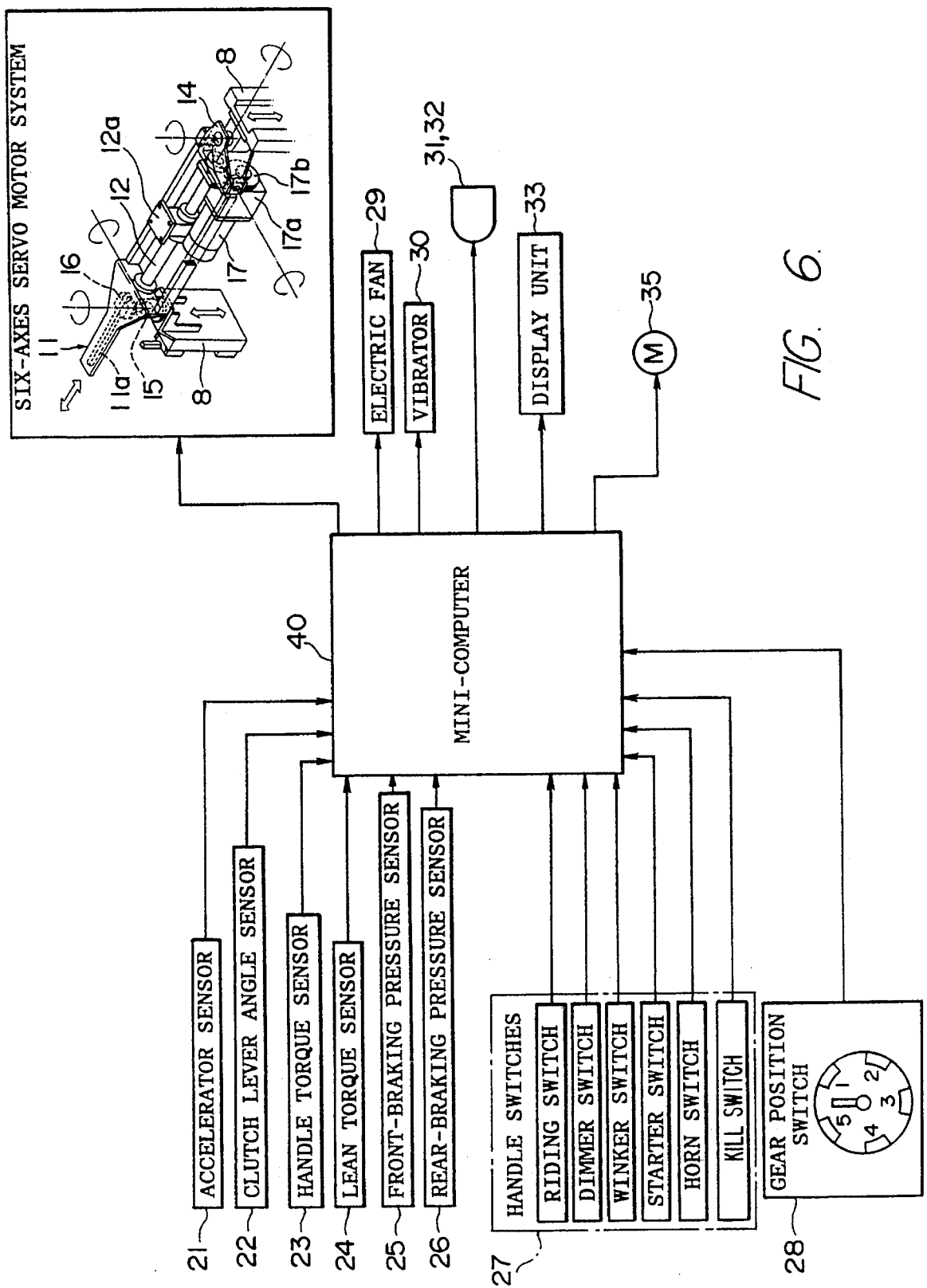
FIG. 6 is a block diagram showing an electric configuration of the first embodiment.

FIG. 6 is a block diagram showing the electrical layout of the motorcycle riding simulation system according to the first embodiment of the present invention. The output signals of the foregoing sensors and switches 21 to 28 are applied to a mini-computer 40, which is constructed by a central processing unit (CPU), a read-only memory (ROM) or random-access memory (RAM) and the like (not shown). Under control of the mini-computer 40, a six-axes servo motor system for driving the motorcycle 13 as shown in FIG. 4, the electric fan 29, vibrators 30, speakers 31, 32, display unit 33 and a servo motor 35 for assisting the steering are to be activated. The above-mentioned six-axes servo motor system controls the yawing angle "y" (see FIG. 7A), rolling angle "r" (see FIG. 7B) and pitching angle "p" (see FIG. 7C) to be applied to the model motorcycle 13. In addition, the lean torque sensor 24 for detecting the leaning angle of the motorcycle 13 is a load cell or the like. Thus, the lean torque sensor 24 can output an electric signal corresponding to the stress (i.e., lean torque) which occurs when leaning the motorcycle 13.

As shown in FIG. 1, there are provided seven speakers including three speakers 31 mounted on the motorcycle 13 and another four speakers 32 arranged in the front and back sides of the motorcycle 13. In order to simulate the real riding condition, the speakers 31 mainly reproduce the lower-pitch sounds, while the other speakers 32 reproduce the higher-pitch sounds. Meanwhile, the revolution speed of the electric fan 29 is controlled by the inverter circuit and the like in proportion to the simulated running speed of the model motorcycle 13. Thus, the wind pressure of the air blown toward the face of the rider by the electric fan 29 is controlled to become larger in response to the increase of the simulated running speed. Similar to the above-mentioned electric fan 29, the vibration produced by the vibrator 30 is controlled to become larger in proportion to the simulated running speed of the motorcycle 13.

FIG. 8 is a flow chart showing the computation which is executed by the foregoing mini-computer 40 when carrying out the running simulation of the model motorcycle 13. In the present embodiment, the running simulation is started under the condition that the motorcycle 13 is running straight, and then the motorcycle 13 is leaned so that the motorcycle 13 is turning. In first step 100, data concerning several kinds of motorcycle running characteristics are set in the mini-computer 40. Then, when the rider starts the running simulation, such start event is detected in step 101. Thereafter, the computation processing enters into step 103 via step 102.

In step 103 where the straight running computation of the motorcycle is to be executed, the mini-computer 40 computes the acceleration or deceleration "G", straight running speed "x", pitching angle "p" upward/downward movement "z" revolution number of engine "Ne", revolution number of front wheel "Nf", revolution number of rear wheel "Nr" etc. Such computation is carried out in accordance with the predetermined programs based on the outputs of the sensors in the mini-computer 40. Herein, the mini-computer inputs the information representative of the throttle operation, clutch stroke, gear position, front braking pressure and rear braking pressure. In addition, the data representative of the motorcycle characteristics which is pre-stored in the mini-computer 40 includes the engine output torque characteristic, brake characteristic, wheel slip ratio, gear deceleration ratio, air resistance, wheel resistance, suspension characteristic, moment of inertia of the wheel, weight of motorcycle and center-of-gravity location of motorcycle.

Figure 13A:
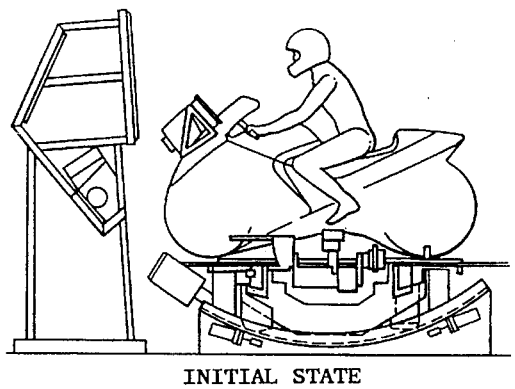
FIGS. 13A–F are side views showing movements of the model motorcycle according to the first embodiment.
Figure 13B:
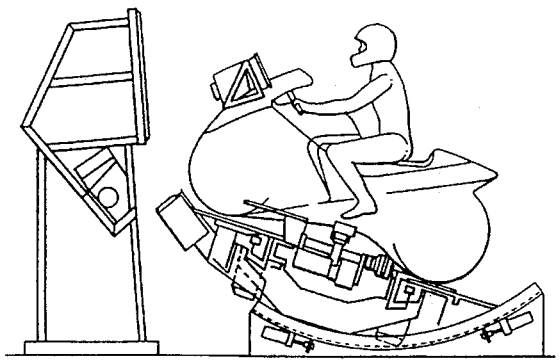
Figure 13C:
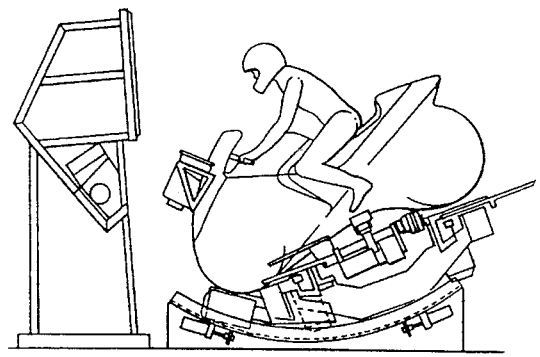
Figure 13D:
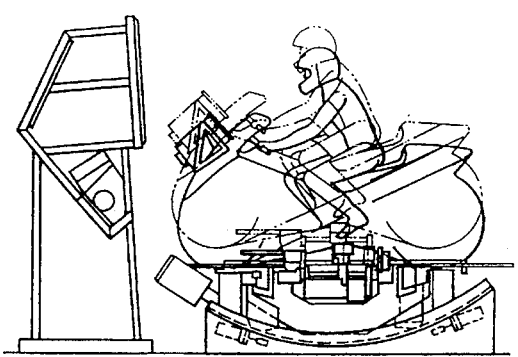
Figure 13E:
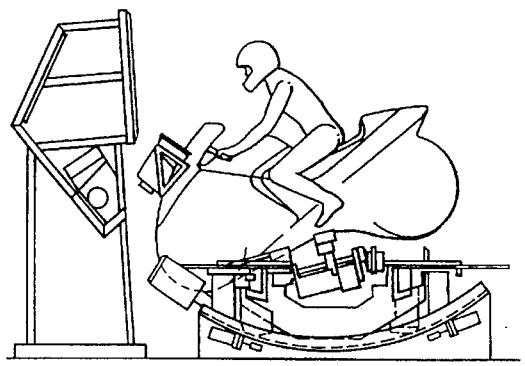
Figure 13F:
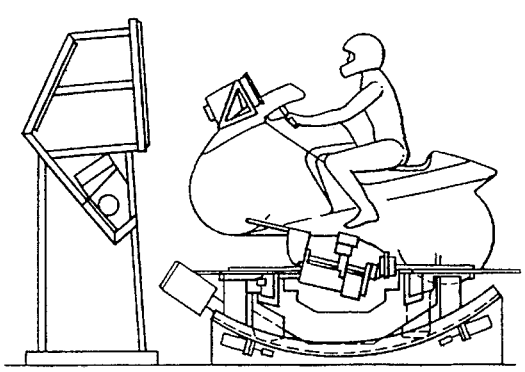

In this case, the foregoing six-axes servo motor system drives the model motorcycle 13 to perform the swing movement in addition to the upward/downward movement so that the rider can feel the acceleration and deceleration. By performing the simple upward/downward movement (see FIG. 5D) or simple front-tripped/rear-tripped movement (see FIGS. 5E, 5F) at the initial stage of the swing movement of the motorcycle 13, it is possible to further improve the acceleration/deceleration simulation of the motorcycle 13. For such object, the present embodiment varies the image displayed on the display screen of the display unit 33. Normally, the display unit 33 displays the image corresponding to the running speed and direction to be applied to the motorcycle 13 such that the rider feels as if the motorcycle actually ran when riding the model motorcycle 13 which does not run. For example, the display unit 33 displays the scenery which can be seen by the rider when the motorcycle runs about the city and the like. In this case, the display image varies quickly when the motorcycle runs at high speed, while the display image varies slowly when the motorcycle runs at low speed. Preferably, the display unit is linked with the model motorcycle as shown in FIG. 5 such that the relative positional relationship between the eyes of rider and the display screen is not substantially varied. However, in order to reduce the production cost of the present system, the display unit is provided apart from the model motorcycle so that the movable carriage 2 is directly placed on the ground as shown in FIG. 13. In the case of FIG. 13, the display image is varied in response to the upward/downward movement of the eyes of the rider which occurs due to the pitching movement when accelerating or decelerating the model motorcycle 13 as shown in FIGS. 13B, 13C. More specifically, when the eyes of the rider are raised up by accelerating the motorcycle, the display image is shifted up as shown in FIG. 9(b) as compared to the display image at a constant speed shown in FIG. 9(a). In contrast, when the eyes of the rider are lowered by decelerating the motorcycle, the display image is shifted down as shown in FIG. 9(c). As described above, the display image is shifted up or down in response to the upward/downward pitching movement of the motorcycle accompanying with the acceleration or deceleration. Thus, the rider can feel the simulated acceleration and deceleration without feeling any sense of disharmony with the actual riding condition. Herein, by correcting the display position based on the pitching angle of the eyes of rider and the pitching angle of the model motorcycle 13, the display image is shifted up or down as described above.

Incidentally, the center-of-rotation height in the swing movement of the motorcycle to be accelerated or decelerated as shown in FIGS. 5B, 5C (or FIGS. 13B, 13C) is fixed at the predetermined position. For example, such center-of-rotation height is fixed at the position in the vicinity of the heart of the rider, which is determined through experimentation. According to the experimental result, in order to simulate the acceleration to be actually applied to the head of the rider who drives the real motorcycle, the center-of-rotation height must be lower than the head of the rider but does not depart from the head of the rider. For this reason, the center-of-rotation height is determined as described above.

After executing the straight running computation of the motorcycle, the computation processing proceeds to step 104 shown in FIG. 8 wherein the curving computation of motorcycle is to be executed.

Figure 10:
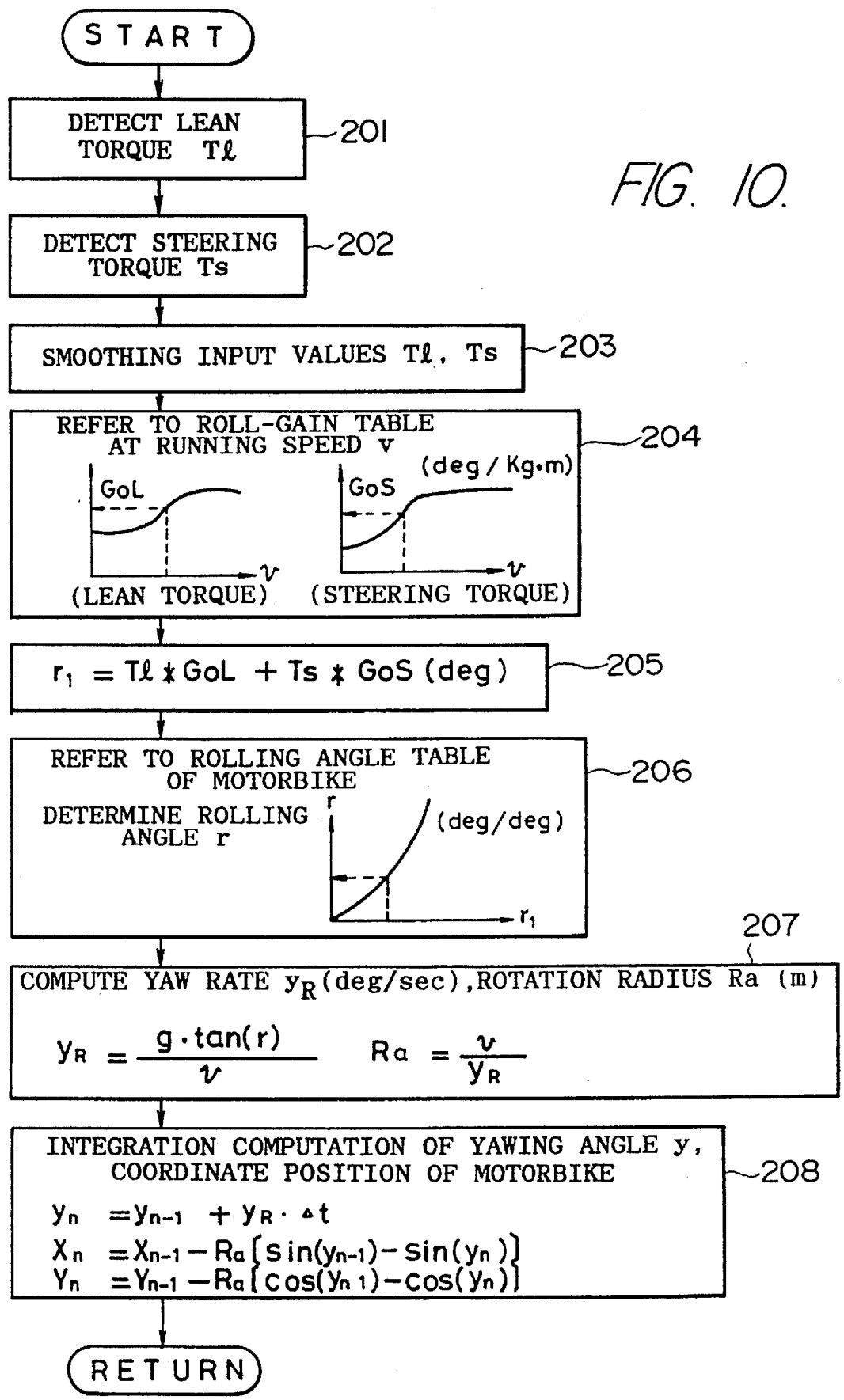
FIG. 10 is a flow chart showing the computation processings which are executed by the computer shown in FIG. 6.

FIG. 10 is a flow chart showing the detailed processings of the curving computation of motorcycle. In steps 201, 202, lean torque T1 and steering torque Ts of the model motorcycle 13 are detected so as to execute the curving computation for the motorcycle.

As is well known, the center-of-gravity of a motorcycle is changed by varying the riding attitude of the rider when changing the running direction. In other words, when turning the motorcycle, the rider moves the handle and simultaneously changes his riding attitude to change the center-of-gravity of the motorcycle. For this reason, in addition to the steering control, the model motorcycle 13 provides a lean torque sensor 24. As described before, this sensor 24 is constructed by the load cell, which detects the force applied thereto, i.e., change of the center-of-gravity of the motorcycle and rider. Then, the sensor 24 outputs the electric signal corresponding to the detection result. This electric signal is supplied to the mini-computer 40.

Next, description will be given with respect to the steering control of the present system. In order to perform the steering control, both the steering angle and steering force of the handle to be detected can be used. However, the present system uses the steering force to be detected by the handle torque sensor 23 for the steering control. Based on the detected steering force, the steering angle is computed.

As compared to an automobile, the steering angle of the motorcycle is very small. In addition, such steering angle of the motorcycle is differed between the low-speed running state and high-speed running state. More specifically, the steering angle must be large when the motorcycle is running at low speed, while the steering angle becomes smaller when the motorcycle is running at middle or high speed. Thus, extremely high precision must be required for the sensor which directly detects the steering angle. On the other hand, the sensor for detecting the steering force may have the relatively narrow detection range which is lower than 5 Kg, for example. In addition, the sensitivity of the sensor for detecting the steering force is hardly affected by the running speed of motorcycle in general. For the reasons described above, the present embodiment employs the sensor for detecting the steering force. Moreover, by use of such a sensor for detecting the steering force, it is possible to drive the model motorcycle which is controlled in response to the detected lean torque even if the rider drives the motorcycle without controlling the handle by his hands. At this time, the steering force remains at zero but the lean torque is varied in response to the center-of-gravity of the motorcycle corresponding to the riding attitude of the rider. Thus, the above-mentioned hands-off driving of the motorcycle can be reproduced by the present system.

Next, in step 203 shown in FIG. 10, the detected lean torque T1 and steering torque Ts is subject to smoothing, by which the noises contained in the detected values are removed. In next step 204, the mini-computer 40 refers to the roll-gain table which is pre-stored. In step 205, the mini-computer 40 computes the rolling angle "r1" in accordance with the following formula (1).

$$r_1 = T1 * GoL + Ts * GoS \qquad (1)$$

In step 206, the computed rolling angle $r_1$ is corrected by use of the rolling angle motorcycle table so as to further compute the actual rolling angle r with accuracy. In step 207, the yaw rate $y_R$ (degree/second) is computed by use of the constant g, rolling angle r and running speed v. Further, rotation radius Ra is computed based on the yaw rate $y_R$ as follows.

$$y_R = g * \tan(r)/v \qquad (2)$$

$$Ra = v/y_R \qquad (3)$$

In step 208, the integration is carried out so as to compute the current yawing angle $y_n$ and x-y coordinates $X_n$, $Y_n$ indicating the currently running position of the motorcycle.

$$y_n = y_{n-1} + y_R * \Delta t \qquad (4)$$

$$X_n = X_{n-1} - Ra[\sin(y_{n-1}) - \sin(y_n)] \qquad (5)$$

$$Y_n = Y_{n-1} + Ra[\cos(y_{n-1}) - \cos(y_n)] \qquad (6)$$

In order to simulate the inclination and centrifugal force to be applied to the motorcycle due to its rolling movement, the present embodiment sets the following conditions.

(1) It is preferable to set the normally used rolling angle at 15 degrees or less. Because, if the rolling angle of the model motorcycle becomes larger than 15 degrees, the rider can hardly ride on the model motorcycle. In some cases, the rolling angle of the real motorcycle is inclined by 15 degrees or more. In order to simulate such a large rolling angle, the present embodiment inclines the display image in addition to the inclination of the model motorcycle, which will be described later in detail.

(2) The center-of-rotation in the rolling movement is varied in response to the simulated running speed of the model motorcycle. As shown in FIG. 11, the center-of-rotation in the rolling movement is positioned at the ground level when the motorcycle is stopped, while it is gradually raised toward the predetermined upper limit level in response to the simulated running speed of the model motorcycle. Herein, such upper limit level is set at a point which is higher than the ground level by 600 mm.

(3) When the model motorcycle is running at the low speed which is lower than 25 km/h, the yawing movement is made in synchronism with the rolling movement. In this case, the direction of the yawing movement is inverse to that of the rolling movement. For example, when the motorcycle is rolled in right-lean direction shown in FIG. 7B, the yawing movement is made in left-turn direction shown in FIG. 7A. Herein, the center-of-rotation of the yawing movement is set at a certain position just below the rider's hips. Meanwhile, when the simulated running speed is raised higher than 40 km/h, the above-mentioned synchronization between the rolling movement and yawing movement is canceled.

Next, in step 105 shown in FIG. 8, the coordinates ($X_n$, $Y_n$) which is computed by the curving computation for a motorcycle as described above is converted into the world coordinate system (XO, YO). This world coordinate system corresponds to the data representative of the world map and its scenery. Based on the current world coordinate, the corresponding scenery is displayed by the display unit 33. In step 106, computation of simulation quantity and variation quantity and generation of audio sounds and the like are carried out in order to control the display image. In next step 107, the mini-computer 40 controls the model motorcycle, display unit, etc. based on several kinds of control signals which are computed as described above.

Next, description will be given with respect to the display unit. The display unit can employ several kinds of display systems such as the CRT display and primary-color projector which projects the light of primary colors to the screen. In advance, a moving picture such as the scenery which can be seen from a moving automobile is taken and the corresponding image information is stored. Then, the moving picture to be displayed is varied in response to the simulated running condition of the model motorcycle. Thus, the display is controlled such that the rider of the model motorcycle can feel as if he is riding on and driving a real motorcycle.

For example, in the case where the rider changes his riding attitude and varies the center-of-gravity of the motorcycle to thereby roll the motorcycle when cornering, the actual running feeling cannot be obtained by only inclining the horizon of the display image of the display unit. For this reason, the pitching component representative of the pitching angle of the eyes of rider is added to the rolling angle of the motorcycle, wherein the pitching angle is less than 20% of the rolling angle. Thus, as shown in FIG. 12, when cornering the motorcycle, the horizon of the display image is lowered in response to the pitching angle of the eyes of the rider so that the actual rider feeling can be obtained. Such display control simulates the fact in which the viewpoint of the rider is lowered in a cornering event as compared with a straight running event of the motorcycle. As described before, the rolling angle of the model motorcycle is limited for the safety of the rider. In order to compensate for the limit of the rolling angle, the horizon of the display image is inclined in the direction inverse to the rolling direction when the rolling angle becomes larger. Thus, the rider can feel that the model motorcycle rolls well as if he is riding on a real motorcycle.

Next, description will be given with respect to the second embodiment of the present invention by referring to FIGS. 14 to 16. Herein, the description concerning the parts identical to those in the foregoing first embodiment is omitted, hence, description will be only given with respect to the parts different from those of the first embodiment.

In the foregoing first embodiment, the model motorcycle 13 as a whole is mounted on the movable carriage 2, and the axes for the yawing movement, rolling movement and pitching movement are arranged within the movable carriage 2. However, such construction complicates the mechanism of the riding simulation system. In order to simplify the construction, the second embodiment cancels the movable carriage.

Figure 14:
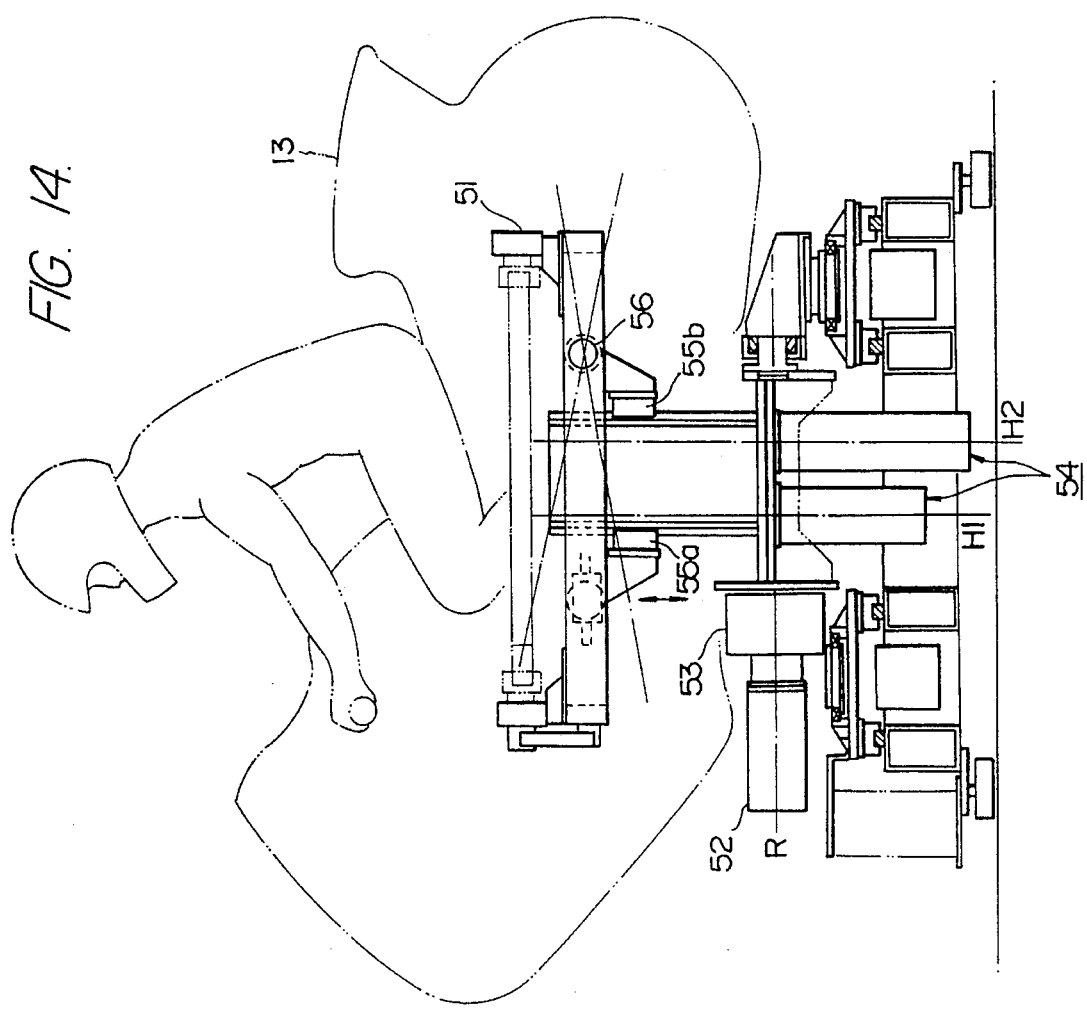
FIG. 14 shows a side view of a riding simulation system for a motorcycle according to a second embodiment.

In the second embodiment as shown in FIG. 14, the model motorcycle 13 which is connected to the base via a frame 51 is subject to the rolling movement which is driven by a motor 52 and a gear box 53. Meanwhile, the model motorcycle is driven in an upward direction by an elevation motor 54. In this case, a pair of bearing members 55a, 55b for transmitting the driving force of the elevation motor 54 are fixed at the frame 51. Herein, the bearing member 55a can slide in upward and downward directions, while another bearing member 55b is coupled to a pitching fulcrum 56. Therefore, the model motorcycle 13 is subject to the pitching movement by revolving around the pitching fulcrum 56 in response to the driving force of the elevation motor 54.

Figure 15:
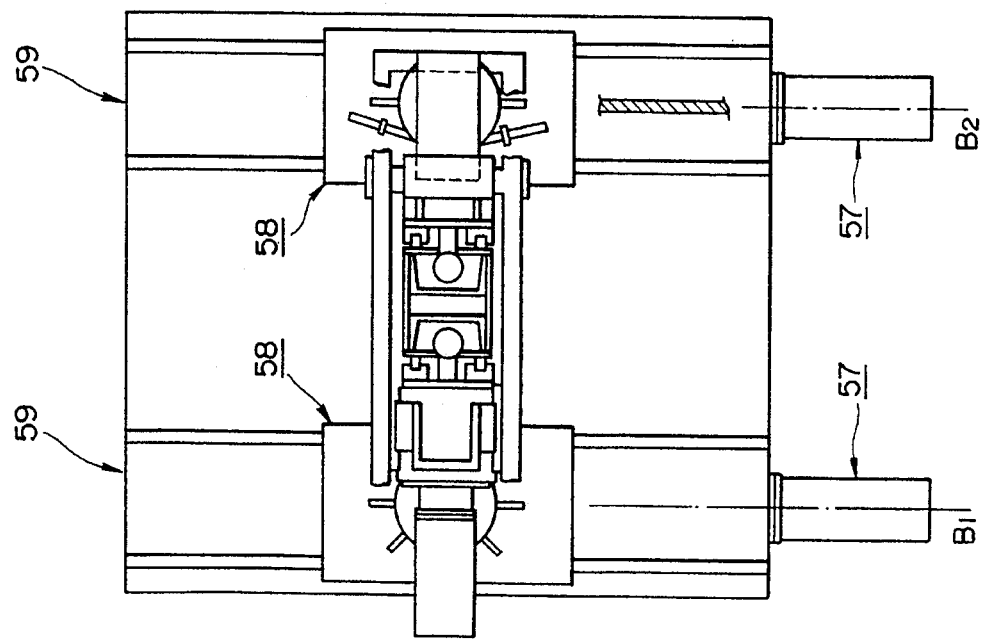
FIG. 15 shows a plan view of a riding simulation system for a motorcycle according to a second embodiment.
Figure 16:
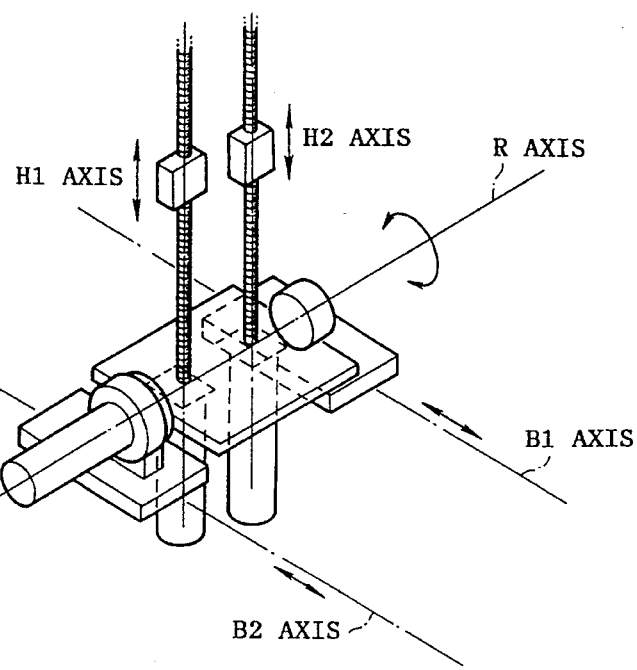
FIG. 16 shows an oblique view of a riding simulation system for a motorcycle according to a second embodiment.

Meanwhile, the yawing movement is performed in response to the driving forces of a pair of motors 57 shown in FIG. 15. More specifically, by driving these motors 57 in different directions respectively, plates 58 on which both wheels of the model motorcycle 13 are fixed slide along rails 59 in different directions respectively so that the yawing movement can be obtained. As comparing to the first embodiment, the rails 59 exclusively used for the yawing movement are arranged perpendicular to the center axis of the model motorcycle 13, so that the second embodiment can obtain the longer stroke (i.e., larger movable range) in the yawing direction. In the second embodiment, the relationship between H1, H2 axes for the pitching movement, rolling axis R and B1, B2 axes for the yawing movement is set as shown in FIG. 16.

Figure 17:
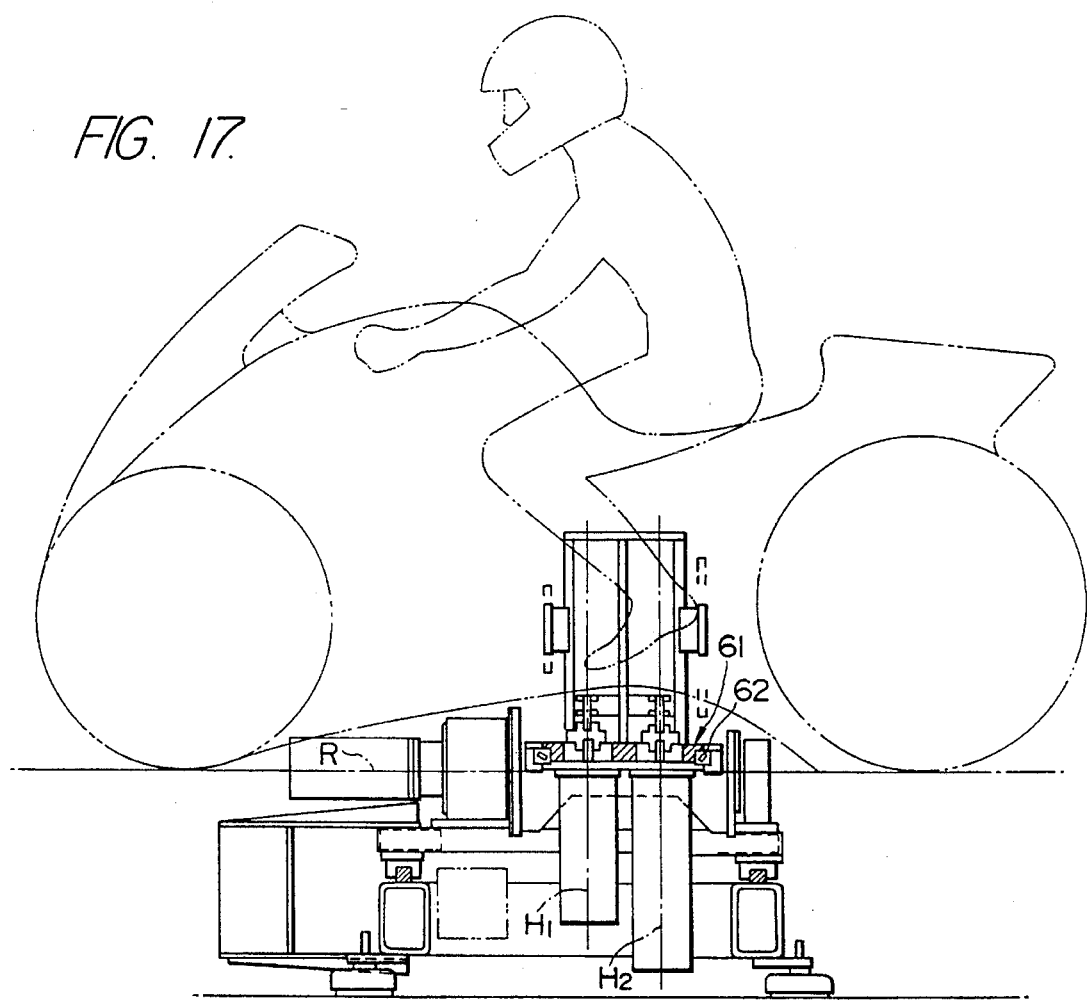
FIG. 17 shows a side view of a riding simulation system for a motorcycle according to a third embodiment.
Figure 18:
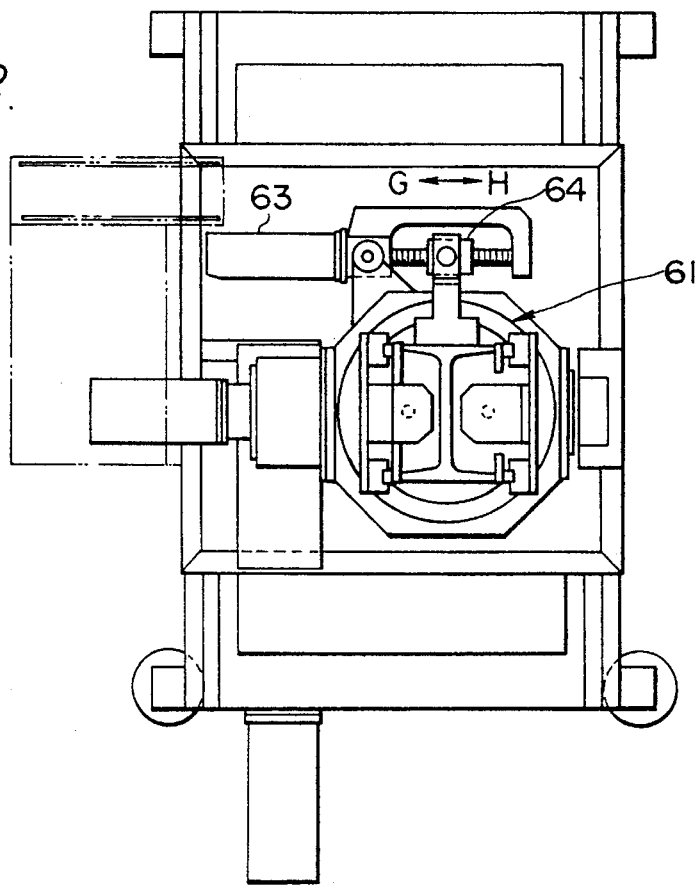
FIG. 18 shows a plan view of a riding simulation system for a motorcycle according to a third embodiment.
Figure 19:
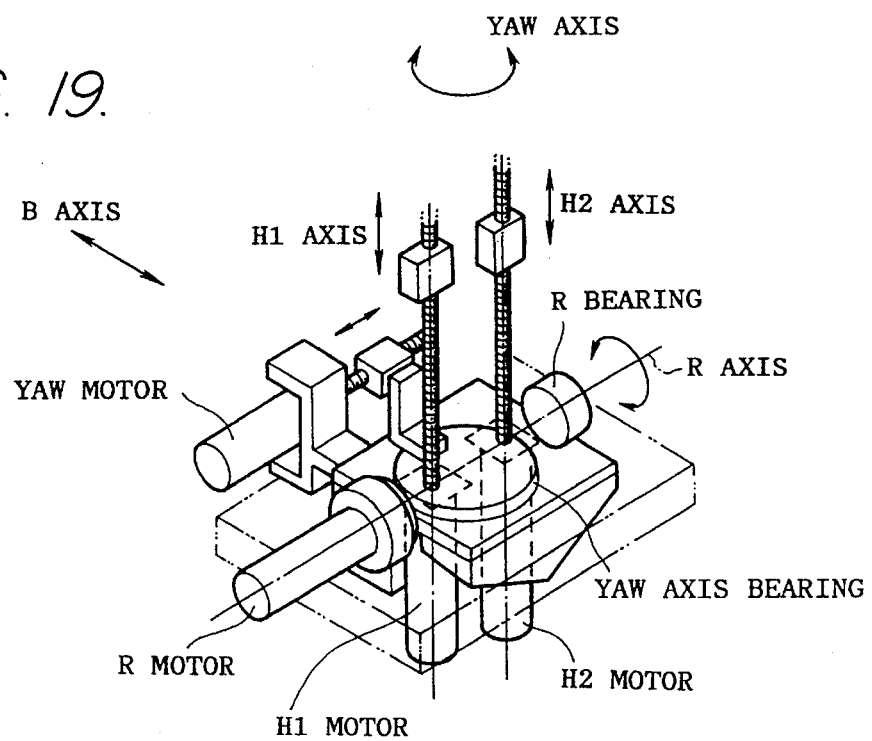
FIG. 19 shows an oblique view of a riding simulation system for a motorcycle according to a third embodiment.

As compared with the above-mentioned second embodiment, the third embodiment is characterized by providing a rotary table 61 for the yawing movement (see FIGS. 17, 18). This rotary table 61 is mounted to the base via a cross-roller bearing 62. In this case, the driving force of a yaw motor 63 is transmitted to the rotary table 61 via a slide member 64. Thus, the rotary table 61 rotates in directions GH shown in FIG. 18. As a result, the yawing movement can be obtained by the rotary table 61. Herein, the relationship between the moving directions and axes is as shown in FIG. 19.

Incidentally, the center-of-rotation in the yawing movement is positioned just below the hips of the rider, for example.

Figure 20:
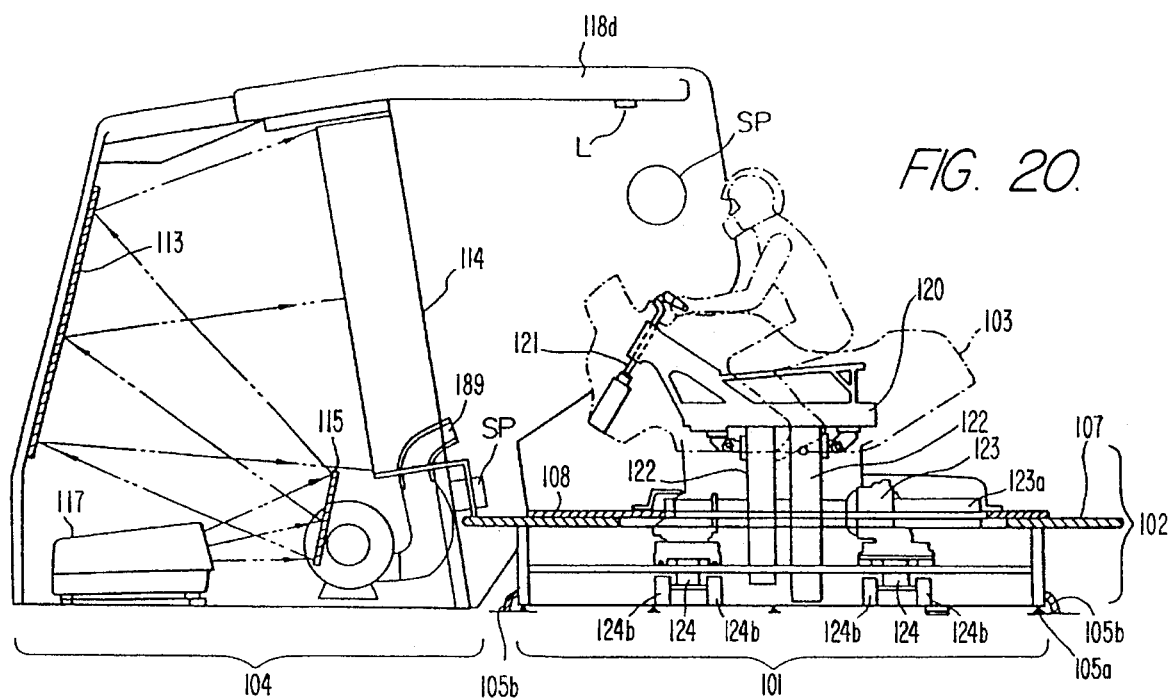
FIG. 20 is a side view showing an entire mechanical construction of a riding simulation system according to a fourth embodiment of the present invention.
Figure 21:
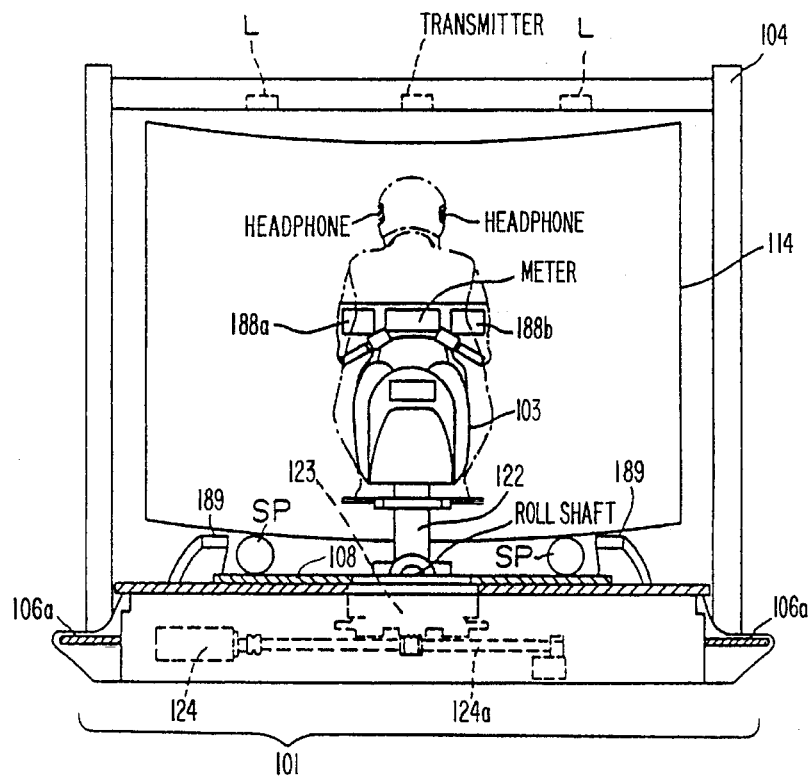
FIG. 21 is a rear view of the system of FIG. 20.
Figure 23:
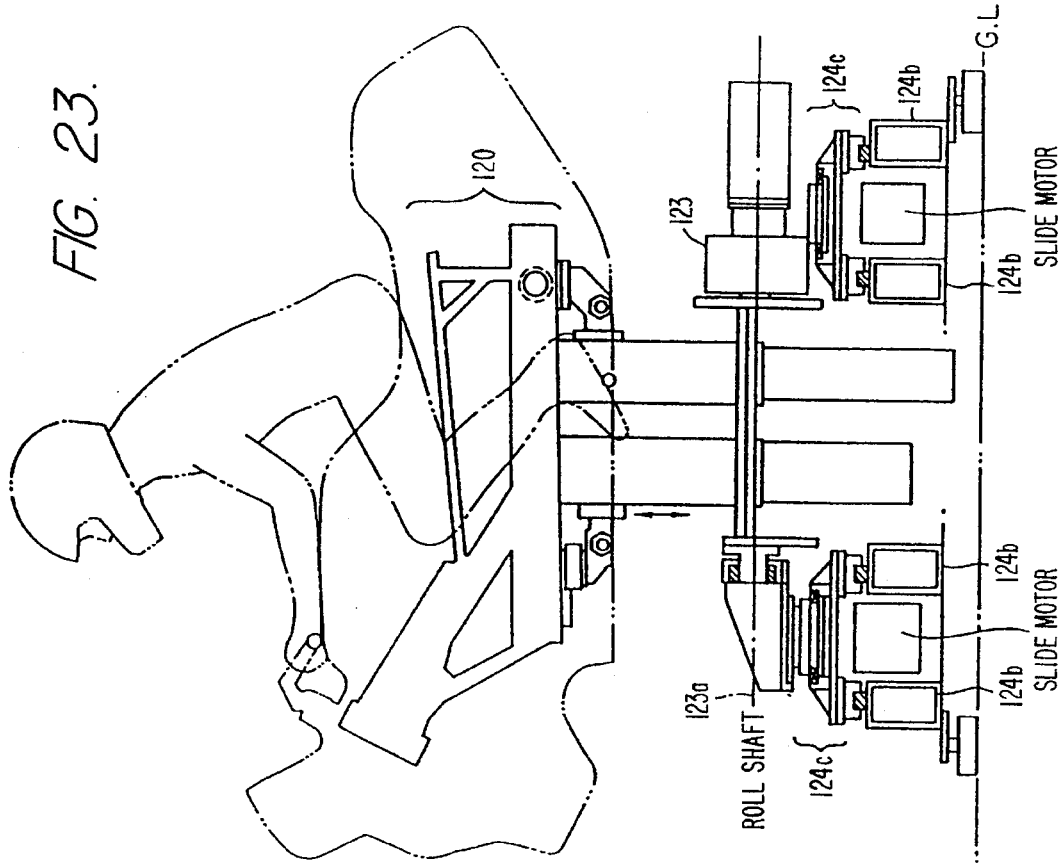
FIG. 23 is a side view showing the structure of a principal portion of a moving mechanism portion in the fourth embodiment.
Figure 22:
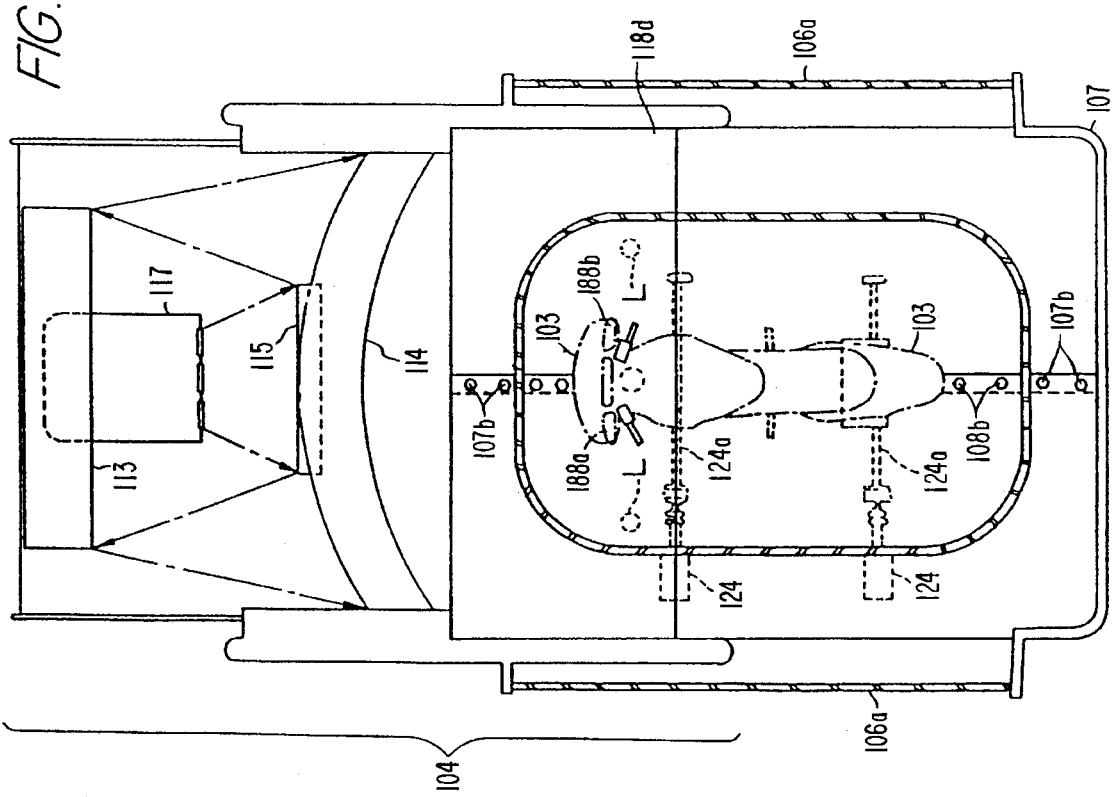
FIG. 22 is a plan view of the system of FIG. 20.

FIGS. 20 to 22 are a side view, a rear view and a plan view, respectively, showing a mechanical construction of a riding simulation system according to a fourth embodiment of the present invention. Referring first to FIG. 20, an explanation will now be made about a schematic structure of this embodiment. In the same figure, the numeral 101 denotes a base and numeral 102 denotes a moving mechanism portion disposed on the base 101. Numeral 103 denotes a two-wheeled simulation vehicle simulative of an actual two-wheeled vehicle. The two-wheeled simulation vehicle 103 comprises a vehicle body frame 120, a handle mechanism 121, a cowling and a seat, and various sensors attached to the frame 120 to detect driving operations performed by the rider. The details of those various sensors will be described later.

Numeral 104 denotes a display unit disposed in an opposed relation to the base 101 to reproduce driving conditions of the two-wheeled vehicle using sounds and images. The display unit 104 comprises a video projector 117 for the projection of images such as running scenes, a primary reflecting mirror 115 and a secondary reflecting mirror 113 both for reflecting images projected from the projector 117, and a curved screen 114. Further, speakers SP for forming stereophonic sounds of right and left, R/L, channels for the riders spotlights L for lighting when the rider gets on the vehicle, and fans 189 for the supply of wind and for thereby imparting a drive feeling to the rider, are attached to the display unit 104 in predetermined positions. The fans 189 are disposed in a booth formed behind the curved screen 114 where the projector 117 is disposed. The fans 189 also function to suppress the rise of temperature in the booth and are controlled to be kept ON for a certain time even when the vehicle speed is zero.

Referring now to FIGS. 20 to 22, the following description is provided about a schematic construction of the moving mechanism portion 102. The moving mechanism portion 102 is disposed in the two-wheeled simulation vehicle and functions to impart rolling, pitching and swing motions to the simulation vehicle 103 on the basis of outputs provided from various sensors which detect driving operations of the rider. Such moving mechanism portion 102 comprises a pitching mechanism 122, a rolling mechanism 123 and a swing mechanism 124. The pitching mechanism 122 engages the vehicle body frame 120 which constitutes the two-wheeled simulation vehicle, to move the frame 120 up and down, that is, impart pitching motions to the frame. The rolling mechanism 123 causes the two-wheeled simulation vehicle 113 to tilt about a roll shaft 123a and thereby causes it to roll, together with the pitching mechanism 122.

The swing mechanism 124 comprises a slide motor fixed between slide rails 124b which are laid in predetermined front and rear positions, respectively, in the longitudinal direction of the base 101, as well as a gear box and a shaft 124a which are connected to the slide motor. By moving a slide table 108 disposed on the a base 101 in opposite, right and left directions, the two-wheeled simulation vehicle 103 is allowed to swing right and left, together with the pitching mechanism 122 and the rolling mechanism 123. As shown in FIG. 4, the rolling mechanism 123 and the swing mechanism 124 are connected with each other through a rotation support portion 124c so that the roll shaft 123a is also allowed to swing when swing motions are imparted to the vehicles. The mechanisms 122, 123 and 124 are each controlled by a computer system (not shown). As to the construction of the said computer system, it will be described later.

With reference to FIGS. 23 to 36, the following description is now provided about the constructions of various components of this riding simulation system.

Figure 24:
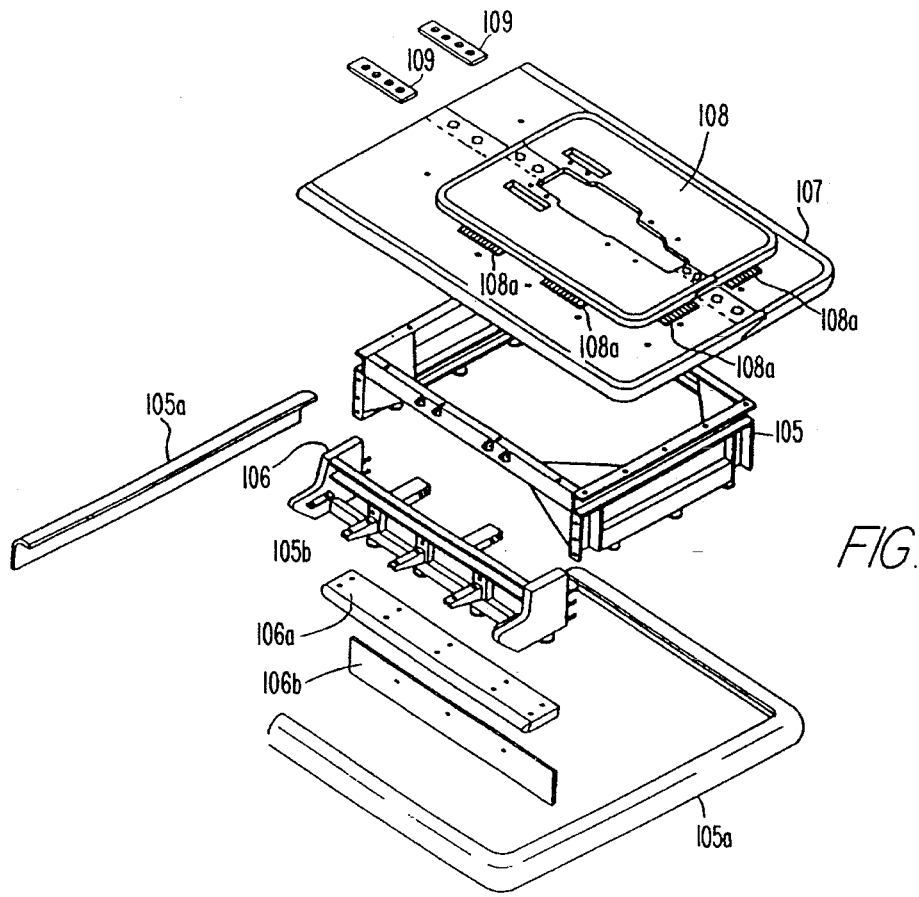
FIG. 24 is an exploded perspective view showing the structure of a base in the fourth embodiment.

FIG. 24 is an exploded perspective view showing a principal portion of the base 101. In the same figure, numeral 105 denotes a base frame as a main constituent of the base 101. To the upper surface of the base frame 101 is fixed a main board 107, on which is disposed the foregoing slide table 108 slidably through slide plates 108a.

Figure 38:
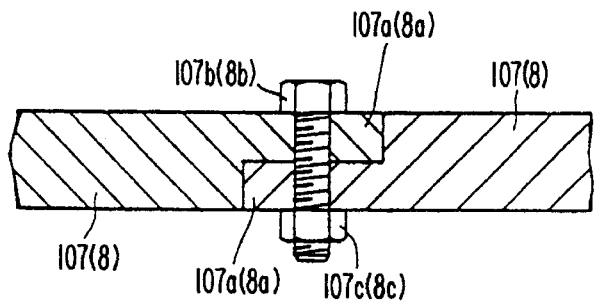
FIG. 38 is a longitudinal sectional view of a main board.

The slide table 108 is moved by the swing mechanism 124. The main board 107 and the slide table 108 each have a dividable structure so that they can be carried easily. According to this structure, as shown in FIG. 38, connections 107a (108a) each having a thickness half the thickness of the body portion are fixed together with bolt 107b (108b) and nut 107c (105c). These floor portions are colored in approximately the same color as the color of the road surface so that a real feeling is obtained.

Numeral 106 denotes a step support which is fixed to each of both side faces in the longitudinal direction of the base 101. To the step support 106 are fixed a step plate 106a for stepping up and down as well as a side plate 106b. Numeral 109 denotes a connector cover for fixing connector ends of various cables disposed on the main board 107. Numeral 105a denotes a flexible cover for the lower portion of the base 101, thereby eliminating a gap which is apt to be formed between the road surface and the lower end of the base 101 at the time of operation of an inclination adjusting mechanism 105b provided at the base lower end, to prevent the entry of dust and the like into the base 101.

Figure 25:
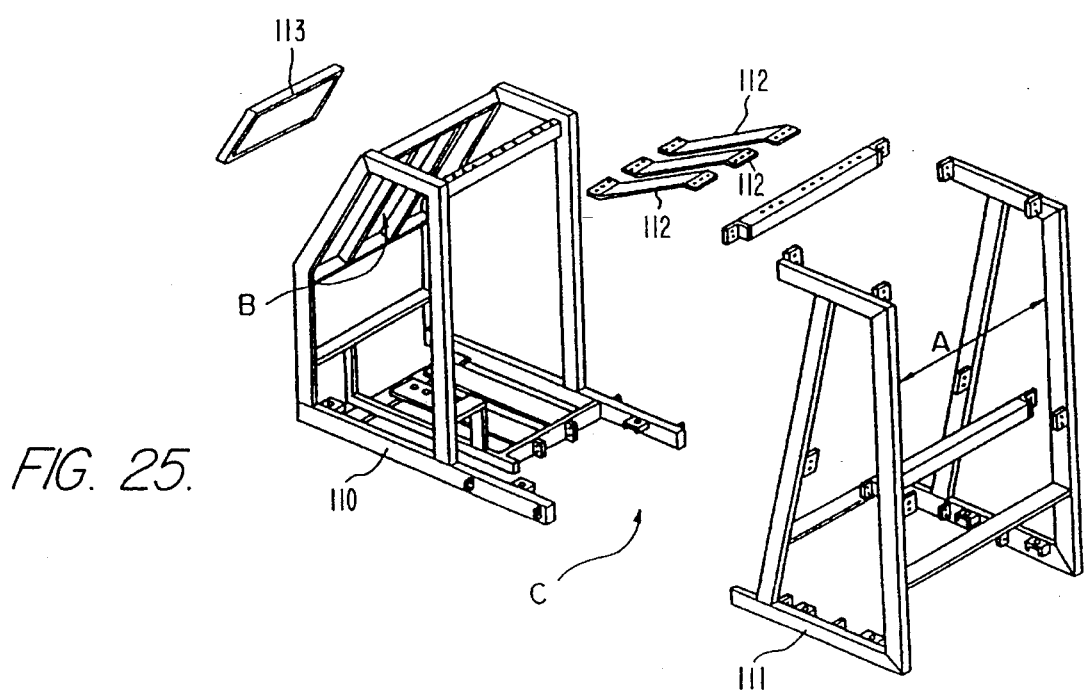
FIG. 25 is a perspective view showing a frame structure of a display unit in the fourth embodiment.
Figure 26:
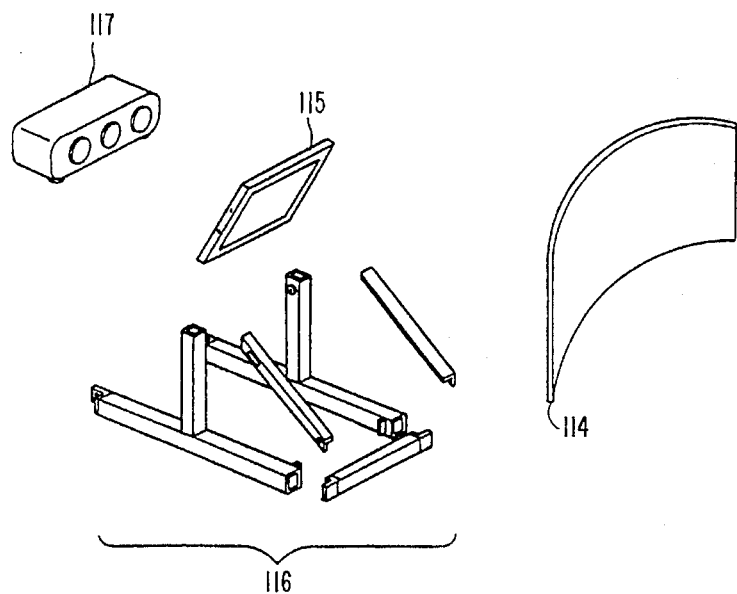
FIG. 26 is a perspective view showing a frame structure of the display unit.
Figure 27:
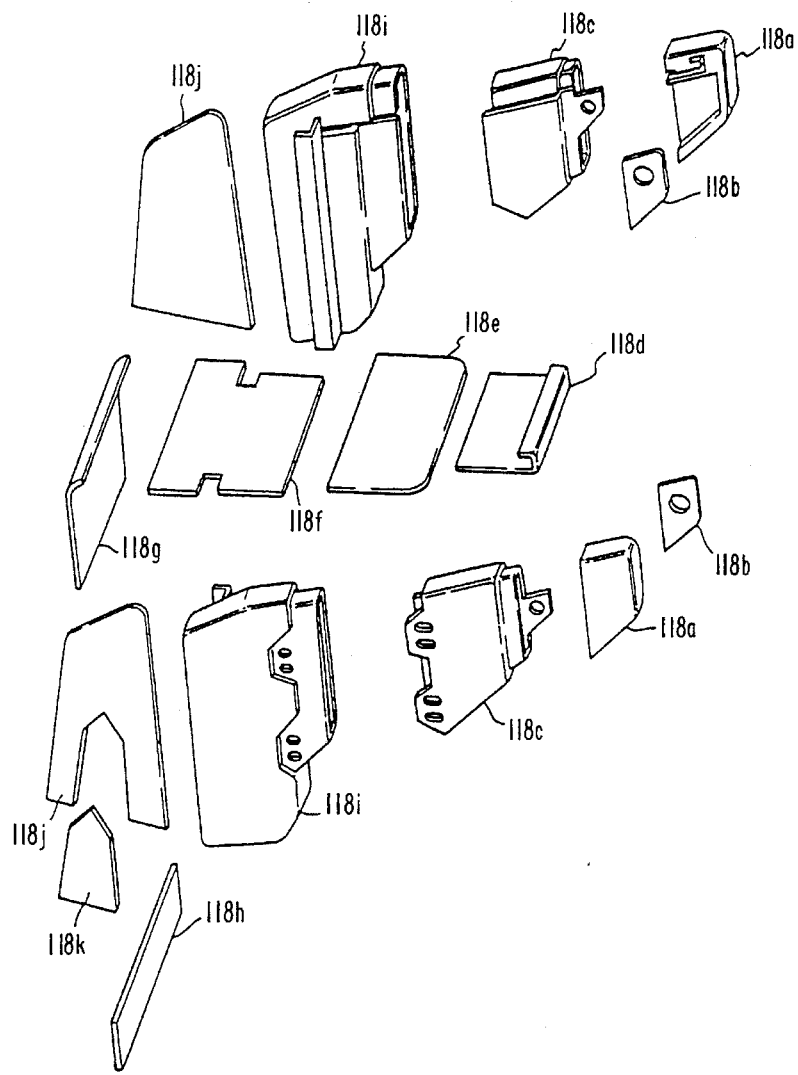
FIG. 27 is a view showing the construction of the display unit.

FIGS. 25 to 27 are exploded perspective views showing the structure of the display unit 104. As shown in FIG. 25, which illustrates a frame structure of the display unit 104, this display unit comprises a projector frame 110, a screen frame 111, and frame cross pieces 112 for connecting those frames. In the projector frame 110 there are disposed the video projector 117 and the secondary reflecting mirror 113, the mirror 113 being mounted in the position indicated at B in the figure. On the other hand, the curved screen 114 is fixed to the screen frame 111 in the position indicated at A in the figure.

The primary reflecting mirror 115 is fixed by a primary reflecting mirror fixing frame 116 of such a frame-structure as shown in FIG. 26. The frame 116 is disposed in the position indicated at C in FIG. 25. In this construction, images from the video projector 117 are projected onto the curved screen 114 through the optical path illustrated in FIG. 20. The curved screen 114 has a predetermined curvature, so as to have a center thereof on the side where the simulation vehicle 103 is present, whereby not only the images projected thereon are satisfactory but also running scenes having reality can be imparted to the rider of the simulation vehicle 103. Preferably, the screen 114 is curved so that the distance from the rider on the simulation vehicle up to the screen is constant, in other words, the center of curvature is positioned near the rider. This is for minimizing the change in focal length of the rider with respect to the screen 114 to make it easier for the rider to see the images on the screen.

Since the rider mainly sees the central portion of the screen, it is sufficient for clear images to be obtained only on the central portion of the screen. Of course, an adjustment may be made so as to provide clear images projected on the both right and left end portions of the screen 114 by using an appropriate shape of the reflective surface of the primary or secondary reflecting mirror 115 or 113.

FIG. 27 is an assembly diagram showing in what manner panels to be mounted to the above frames are assembled. As shown in the same figure, first, a projector side plate 118j is mounted to each of both side faces of the projector frame 110. A door member 118k is fitted in the projector side plate 118j. To both side faces of the screen frame 111 are mounted screen side plates 118c which are fitted on side boards 118i. Further, slide boards 118a for surrounding the curved screen 114 are fitted on the side plates 118c.

Inside each of the slide boards 118a there is mounted a speaker mounting plate for the mounting of the speaker SP. Next, top plates 118d to 118g are mounted, extending over the upper surfaces of the frames 110, 111 and the rear surface of the frame 111, to form a roof of the display unit 104. To the top plate 118d are attached the spotlights L (see FIG. 20) and a transmitter. The transmitter is for transmitting a voice to headphones incorporated in a helmet of the rider. The headphones are each constituted by an integral combination of a receiver and a speaker. For example, as transmitting means, there may be used a radio wave, e.g. FM, or an infrared ray.

Figure 28:
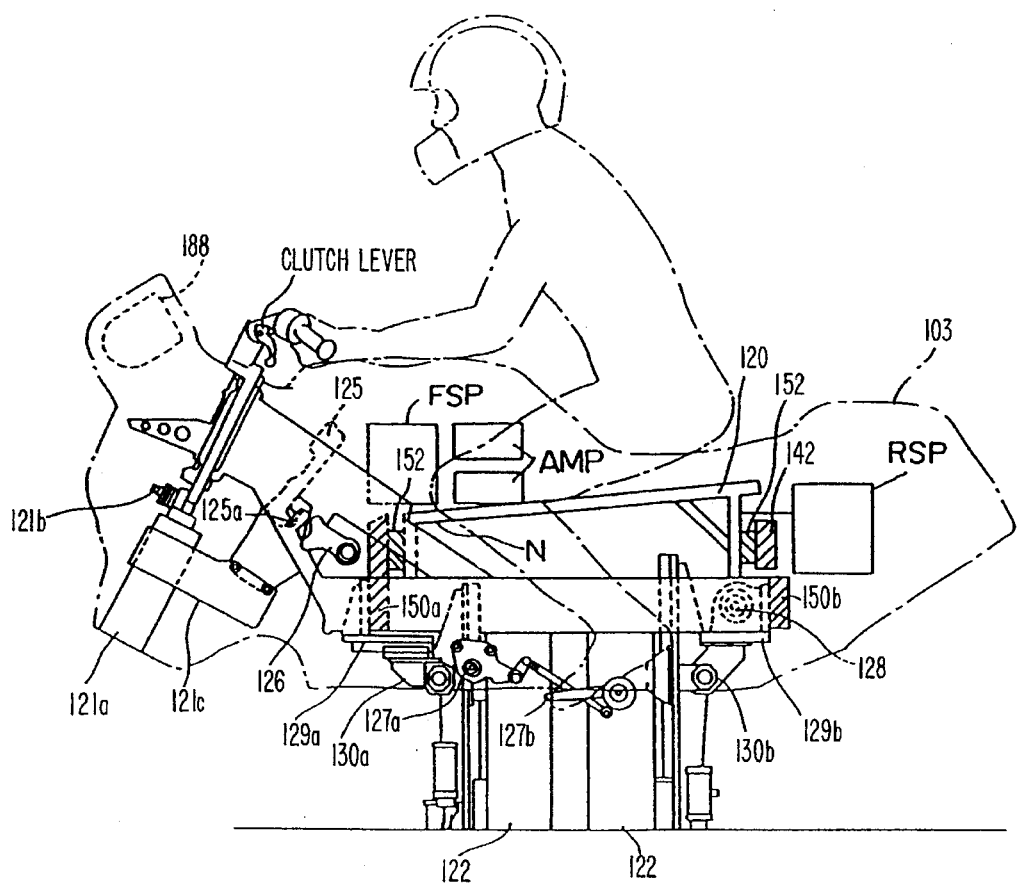
FIG. 28 is a side view showing a schematic structure of a two-wheeled simulation vehicle in the fourth embodiment.

With reference to FIG. 28, the construction of a principal portion of the two-wheeled simulation vehicle 103 and that of the pitching mechanism 122 engaged with the vehicle will now be described. In the same figure, the numeral 121a denotes a handle moving motor which provides a reaction force proportional to a steering operation of the rider, thereby creating a feeling of steering close to that in actual steering. Numeral 121b denotes a handle torque sensor for detecting torque in such a steering operation. Numeral 121c denotes a motor stay which supports the handle moving motor 121a.

To the vehicle body frame 120 there are mounted a clutch sensor 125 for detecting a clutch operation, a throttle sensor 126 for detecting a throttle operation, a gear change switch 127a for detecting a gear changing operation, and a lean torque sensor 118 for detecting a weight shift of the rider in cornering. In front and rear portions of the body frame 120 there are provided a front speaker FSP and a rear speaker RSP, respectively, for reproducing driving conditions, including running noises and engine noise. Further, on the bottom side of the body frame 120 there are formed a gear change mechanism 127 and a stay for the mounting of step.

Numerals 129a and 129b denote a front frame mounting bracket and a rear frame mounting bracket, respectively, which are fixed to the bottom of the vehicle body frame 120. To these brackets 129a and 129b are attached mounting mechanisms 130a and 130b, respectively, and through the mounting mechanisms 130a and 130b the pitching mechanism 122 is engaged with the body frame 120. As to the engagement between the pitching mechanism 122 and the body frame 120, it will be described later.

The structures of various components of the two-wheeled simulation vehicle 103 constructed as above will be described below successively with reference to FIGS. 29 to 36.

Figure 29:
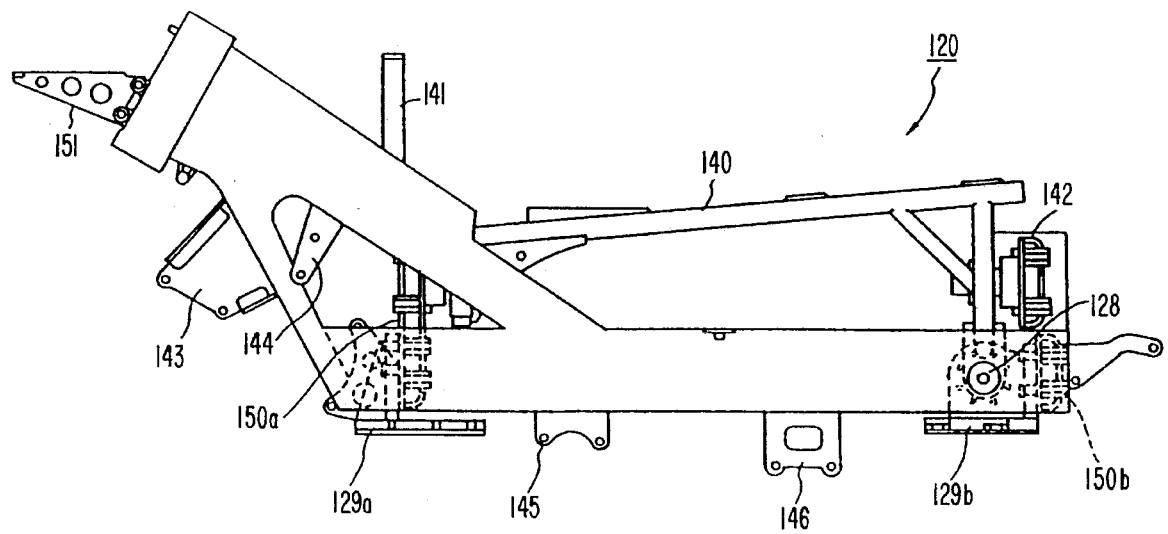
FIG. 29 is a side view showing the structure of a vehicle body frame in the fourth embodiment.
Figure 30:
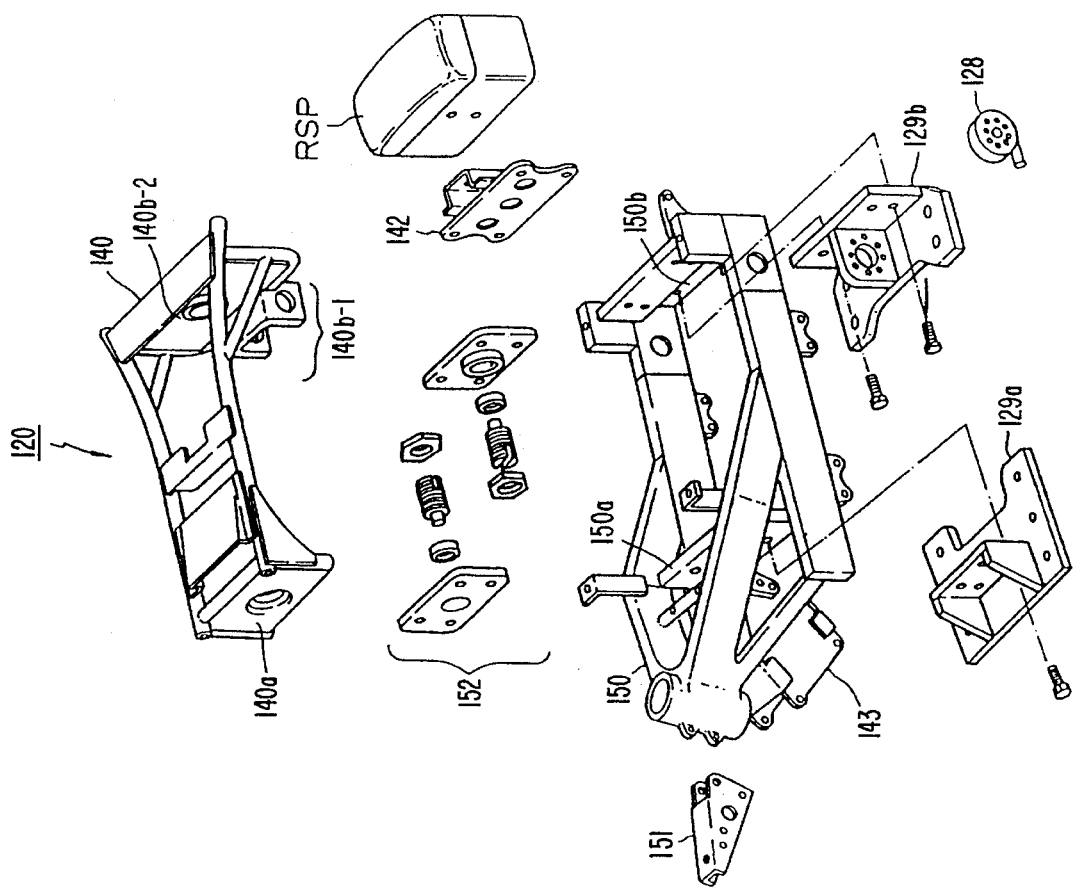
FIG. 30 is a perspective view for explaining the structure of the vehicle body frame.

FIGS. 29 and 30 are a side view and an exploded perspective view, respectively, showing principal portions of the vehicle body frame 120. As shown in these figures, the 10 vehicle body frame 120 comprises a body frame 150 which is caused to perform rolling, pitching and swing motions by the moving mechanism portion 102, and a seat rail (seat portion) which is mounted to the body frame 150 rockably in the rolling direction as will be described later and which supports a seat (not shown) on which the rider sits. Numeral 141 denotes a front speaker stay for the mounting of the front speaker FSP, while numeral 142 denotes a rear speaker stay for the mounting of the rear speaker RSP. Numeral 143 denotes a handle motor mounting member for the mounting of the handle moving motor 121a and numeral 144 denotes a throttle sensor mounting member for the mounting of the throttle sensor 126. Numeral 145 denotes a gear change mechanism mounting member for the mounting of both the gear change switch 127a and a change pedal 127b. Numeral 146 denotes a step holder stay for the mounting of step and numeral 151 denotes a cowl stay. These members 141, 142, 143, ... 151 are mounted fixedly to the body frame 150.

As shown in FIGS. 28 and 30, the seat rail 140 is mounted at a front end portion 140a thereof to a cross member 150a of the body frame 150 through a seat rail mounting mechanism 152. The seat rail mounting mechanism 152 comprises holder, bearing, etc. and is constructed so as to render the seat rail 140 tiltable. A rear end 140b-2 of the seat rail 140, like the front end portion 140a, is mounted to a cross member 150b through the seat rail mounting mechanism 152. On the other hand, a rear, lower end (unfixed) 140b-1 of the seat rail 140 in a position different from the rocking axis is fixed to a rear frame mounting bracket 129b through a lean torque sensor 128. As the lean torque sensor 128 there is used a known load cell. According to this structure, the seat rail 140 tilts in response to a weight shift of the rider, e.g. a weight shift in cornering, and a pressure is applied to the lean torque sensor 128, which in turn produces a signal corresponding the weight shift of the rider. The front portion of the seat rail extends ahead of the rider's knee grip portion (see FIG. 28).

Figure 31:
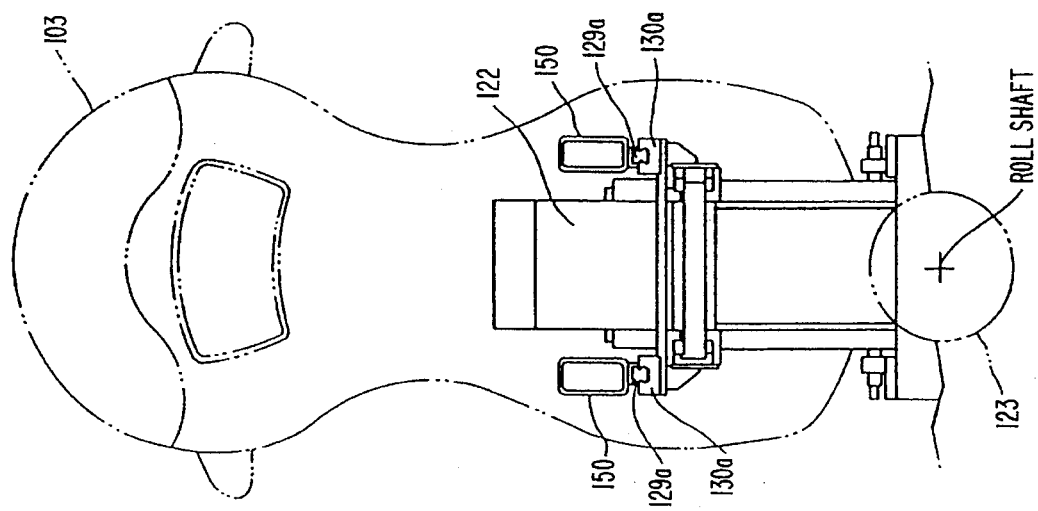
FIG. 31 is a front view showing a schematic structure of the two-wheeled simulation vehicle.
Figure 32:
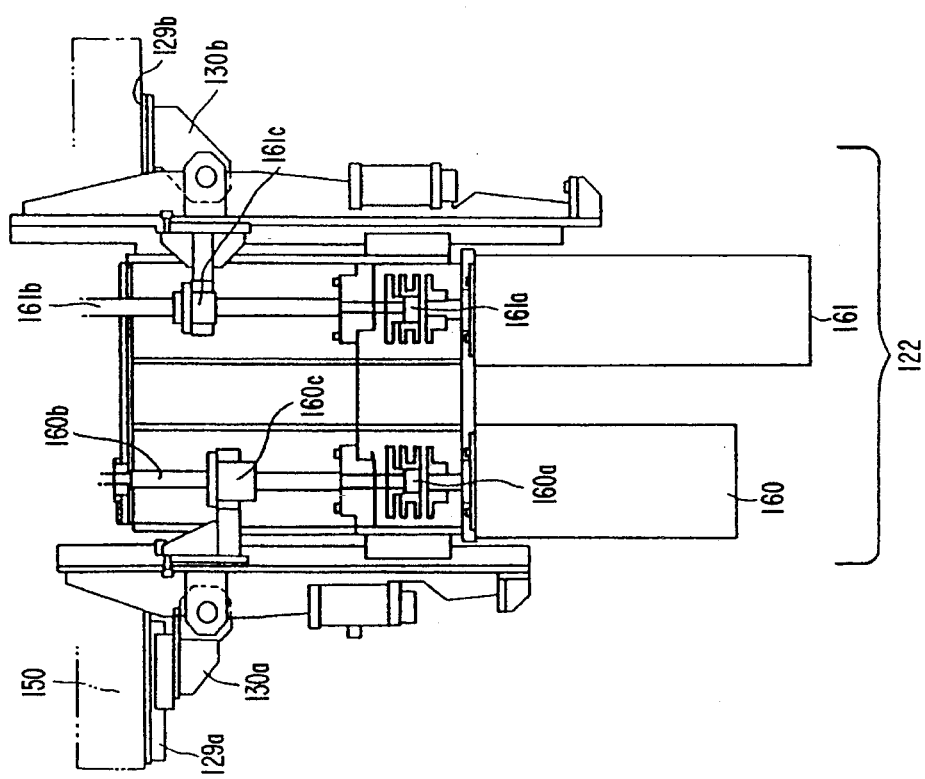
FIG. 32 is a side view showing the structure of a pitching mechanism in the fourth embodiment.

The following description is now provided about a principal portion of the pitching mechanism 122, with reference to FIGS. 31 and 32. First, as shown in FIG. 31, the front frame mounting bracket 129a is fixed to the bottoms of a body frame 150. On the bottom of bracket 129a there is formed a slide rail and the mounting mechanism 130a is mounted movably in engagement with the slide rail. On the other hand, the mounting mechanism 130b is fixed to the rear frame mounting bracket 129b. These mounting mechanisms 130a and 130b are engaged with drive motor portions 160 and 161, respectively, which constitute the pitching mechanism 122.

In FIG. 32, the drive motor portion 160 comprises a transmission mechanism 160a for transmitting the rotation of the motor, a rotating shaft 160b which rotates in forward and reverse directions through the transmission mechanism 160a, and a displacement mechanism 160c which changes its position upward or downward in accordance with the rotation of the rotating shaft 160b. The mounting mechanism 130a is connected with the displacement mechanism 160c. The drive motor portion 161 is also of the same construction, in which the mounting mechanism 130b is connected with a displacement mechanism 161c. The drive motor portions 160 and 161 of such a construction cause the front and rear portions of the body frames 150 to move up and down. For example, when only the front portions of the body frames 150 are to be brought down, the displacement mechanism 160c is displaced downwards in accordance with the rotation of the drive motor portion 160, whereby the mounting mechanism 130a is also forced down. At this time, the mounting mechanism 130a moves toward the front end of the slide rail formed on the bracket 129a, whereby only the front portion of each body frame 150 is displaced downwards and hence the two-wheeled simulation vehicle 103 can be tilted in a sinking fashion. This behavior is simulative of a sinking motion of the front fork in accordance with deceleration, or braking, of an actual two-wheeled vehicle.

Thus, in the pitching mechanism 122, the front and rear portions of the body frames 150 can be vertically moved each independently; besides, since the support point for the front portion of the frame 150 moves, not only mere vertical movements but also pitching motions close to the behavior of the actual two-wheeled vehicle can be provided. For example, it is possible to simulate front/rear leaning behaviors such as "lifting" and "sinking" which occur upon acceleration and deceleration, respectively, in the actual two-wheeled vehicle.

Figure 33:
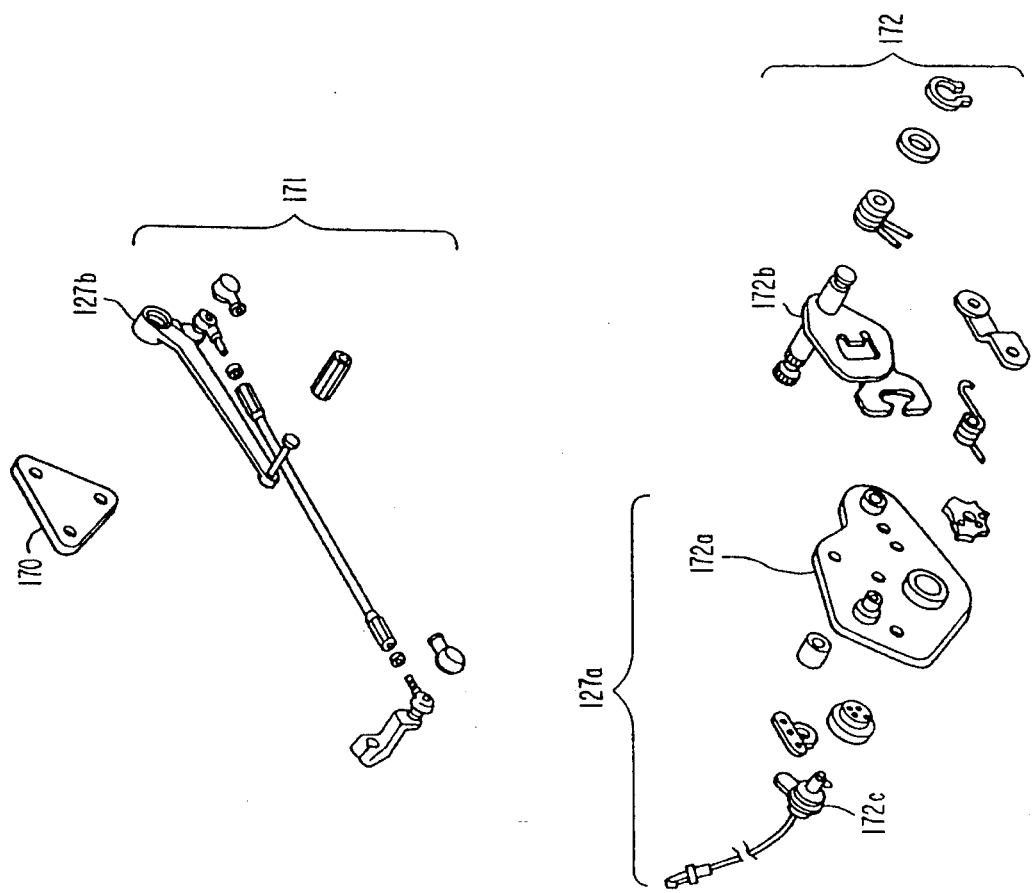
FIG. 33 is an exploded view for explaining a change pedal mechanism and a gear change mechanism in the fourth embodiment.

FIG. 33 illustrates the structure of the change pedal mechanism and that of the gear change mechanism which are disposed on the left side face of the two-wheeled simulation vehicle 103. In the same figure, the numeral 170 denotes a step holder mounted fixedly to the step holder stay 146 (see FIG. 28); numeral 171 denotes a change pedal mechanism composed of a change arm, a tie rod and the change pedal 127b, and numeral 172 denotes a gear change mechanism which is interlocked with the change pedal mechanism 171. The gear change mechanism 172 comprises a gear change switch plate 172a, a pedal shaft 172b mounted to the plate 172a and interlocked with the change pedal mechanism 171, and a change switch 172c which is operated by the shaft 172. According to this construction, not only the gear change feeling in an actual two-wheeled vehicle is obtained but also a gear change signal is formed in accordance with the gear changing operation.

Referring to FIG. 34, which illustrates the structure of the throttle sensor 126 (see FIG. 28), the numeral 126a denotes a potentiometer; numeral 126b denotes a potentiometer mounting plate; numeral 126c denotes a helical coupling which is mounted on a rotating shaft of the potentiometer 126a; numeral 126d denotes a mounting plate to which are mounted the components 126a–126c; numeral 126e denotes a throttle shafts; and numeral 126f denotes a throttle drum. In the throttle sensor 126 of such construction, a throttle cable (not shown) and the throttle drum 126f are connected with each other, and the drum 126f rotates in accordance with opening and closing motions of the throttle valve. With this rotation, the resistance value on the potentiometer 126a varies and a signal corresponding to the throttle valve opening is formed.

FIG. 35 illustrates the structure of the clutch sensor (see FIG. 28). The clutch sensor 125 illustrated therein comprises a clutch sensor plate 125a, a sensor stay 125b for fixing the plate 125a to the vehicle body frame 120, a potentiometer 125c, a gear 125d which supports the potentiometer 125c through a shaft, a gear 125e meshing with the gear 125d, and an arm 125f which supports the gear 125c through a shaft.

In such construction, when a clutch cable (not shown) connected to the arm 125f is pulled in accordance with a clutching operation, the potentiometer 125c rotates through the gears 125e and 125d, whereby there is formed a signal corresponding to the clutching operation.

Referring now to FIG. 36, which illustrates the structure of a handle portion 175, the numeral 175a denotes a key switch, numeral 175b denotes a handle pipe, and numeral 175c denotes a handle end attached to an end of the pipe 175b. A motor 175e for vibration is fitted in the handle end 175c and is fixed with an end cap 175d. The handle pipe 175b is fixed to a fork top 175h through a handle spacer 175f. The motor 175e for simulative vibration of the engine is of a structure wherein a weight is mounted eccentrically on its rotating shaft. The rotating speed of the rotating shaft is controlled in accordance with a signal emitted from a CPU 83 for environment control which will be described later and simulative vibrations of the engine transmitted to the handle pipe 175b are imparted to the rider. Numeral 175j denotes a switch case provided with a starter switch 175k and a kill switch 175l, and numeral 175m denotes a throttle grip.

An electrical construction of the embodiment will now be described with reference to FIG. 37. In the same figure, the numeral 180 represents the foregoing sensors for detecting driving operations performed by the rider and various switches for simulating actual driving conditions, including, for example, key switch, winker ignition switch and horn switch. Numeral 181 denotes a host computer, which not only generates drive signals for the control of rolling, pitching and swing motions in accordance with detected signals and switch operation signals provided from the sensors and switches 180, but also generates a running information of the two-wheeled simulation vehicle on the basis of the above detected signals. The said running information comprises data such as running position coordinates, running speed and advancing direction of the two-wheeled simulation vehicle 103 (hereinafter referred to simply as the "simulation vehicle"). Detected signals fed from the various sensors are once amplified by amplifiers AMP and then fed to the host computer 185 (see FIG. 28).

Numeral 182 denotes a CPU for image control, which generates running scenes to be projected on the display unit 104 in accordance with the running information provided from the host computer 181. The running scenes projected on the display unit 104 are computer graphic images (C.G.I.) prepared by a computer on the basis of simulator position and speed information which are inputted from the host computer 181 with respect to predetermined traveling paths.

The CPU 182 for image control stores a traveling map corresponding to the traveling region in a memory means and converts running position coordinates of the simulation vehicle into points on the traveling map, further, generates coordinate data of another vehicle for random traveling on the same map and outputs these data to the host computer 181. The video projector 117 projects the image fed from the image controlling CPU 182 onto the curved screen 114 in three primary colors. The running scene thus obtained changes in accordance with the foregoing running information. In other words, the video projector 117 changes the image speed in accordance with the running speed of the simulation vehicle in order to create the illusion of running of the simulation vehicle which actually does not run.

Numerals 184a and 184b represent laser disk players which reproduce and output predetermined images in accordance with information fed from the host computer 181. The player 184a selects an image of another vehicle of a size corresponding to the distance between the simulation vehicle and that other vehicle out of images (static images) of other vehicles which have been recorded beforehand in a laser disk, and reproduces and outputs the selected image.

On the other hand, the player 184b records course images (C.G.I.) as seen in the rear view under forward traveling in a traveling section from each branch point of the traveling region, and stores them in a laser disk, then selects and reproduces a course image to be seen from the simulation vehicle in accordance with a branch point information.

Thus, an image of another vehicle which is seen from the simulation vehicle is reproduced and outputted from the player 184a, while a course image which is seen behind the simulation vehicle is reproduced and outputted from the player 184b. Then, both images are combined by an image processor 186. In this image combination, there is performed the known chromakey synthesis, whereby an image of another vehicle of a size corresponding to the distance between both vehicles is formed in the course image which is seen behind the simulation vehicle. That is, the thus-combined image corresponds to the background in the rear view.

Numeral 187 denotes a video effector. The video effector 187 extracts, enlarges and outputs a predetermined region in one frame which is formed by a combined image signal fed from the image processor 186. More specifically, the video effector 187 quarters the above combined image, then extracts from them a background image to be reflected in the view range of rear view mirrors disposed right and left of the simulation vehicle, and outputs it as a rear view mirror image signal. That is, the image is quadrupled.

The rear view mirror image signal thus formed is fed to liquid crystal displays 188a (left) and 188b (right) which are embedded in the rear mirrors of the simulation vehicle. The liquid crystal displays 188a and 188b are each composed of a liquid crystal panel and a Fresnel lens laminated to the liquid crystal panel to enlarge the rear view mirror image projected on the same panel. According to this construction, a background is projected on the liquid crystal displays 188a and 188b of the rear mirrors in accordance with running conditions of the simulation vehicle, thereby making it possible to make simulation of a two-wheeled vehicle drive feeling closer to the actual one.

Numeral 185 denotes a CPU for drive control of a curving type. The CPU 185 controls a driving servomotor 190 of a total of six shafts, including the motors of the pitching mechanism 122, rolling mechanism 123 and swing mechanism 124, in accordance with drive signals fed from the host computer 181 and the sensors 180. For example, when acceleration or deceleration is made by operating the accelerator or the brake, the vehicle body frame 120 is leaned forward or backward by the motor 160 or 161 as described previously to impart an accelerative or decelerative feeling to the rider.

Further, when the image on the display unit 104 approaches a corner portion and the rider shifts his weight in cornering, the seat rail 140 tries to tilt with respect to the body frame 150, and a load responsive to a torque induced by the weight shift is applied to the lean torque sensor 128. At this time, the roll shaft 123a is rotated by the motor 123 in accordance with an output signal provided from the lean torque sensor 128 to tilt the two-wheeled simulation vehicle 103 laterally, and the slide table 108 is allowed to swing by the two motors in the swing mechanism 124 to impart a turn feeling in cornering to the rider.

Figure 39:
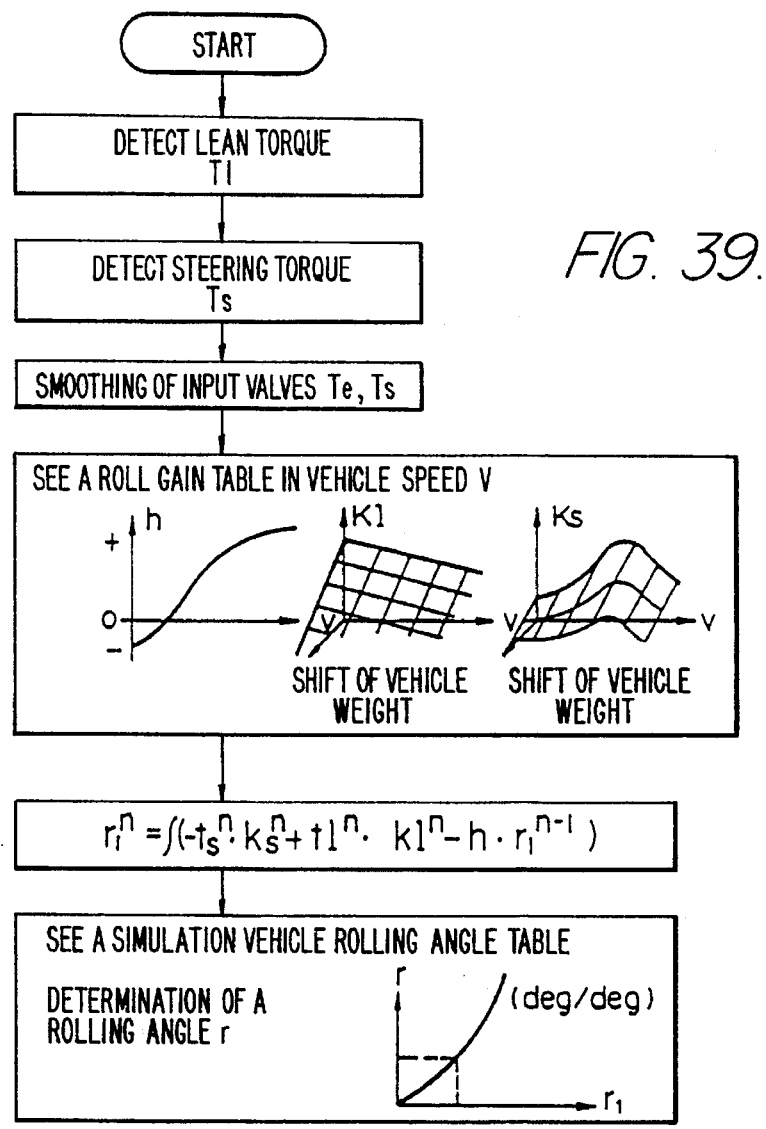
FIG. 39 is a flow chart showing a rolling angle determining procedure.
Figure 44:
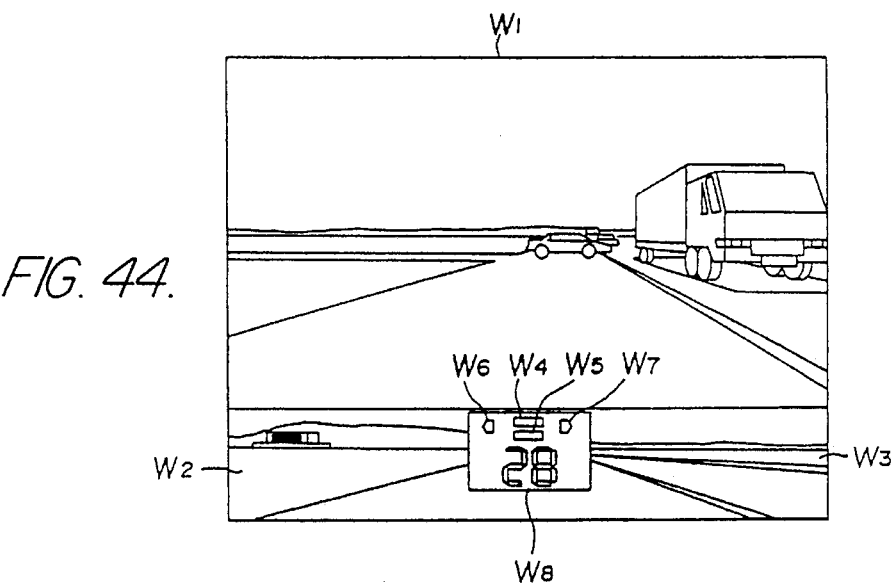
FIG. 44 is a diagram showing another example of printout made by the video printer.
Figure 45:
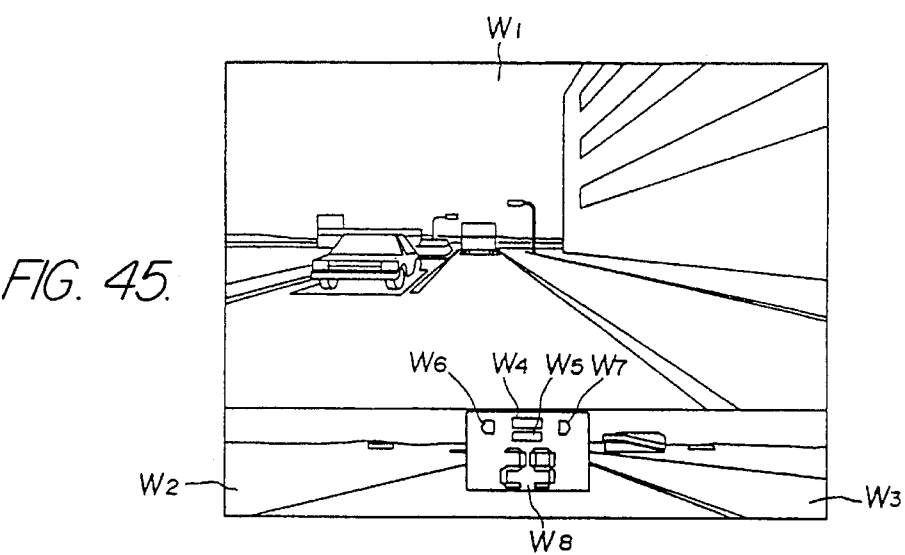
FIG. 45 is a diagram showing a further example of printout made by the video printer.
Figure 46:
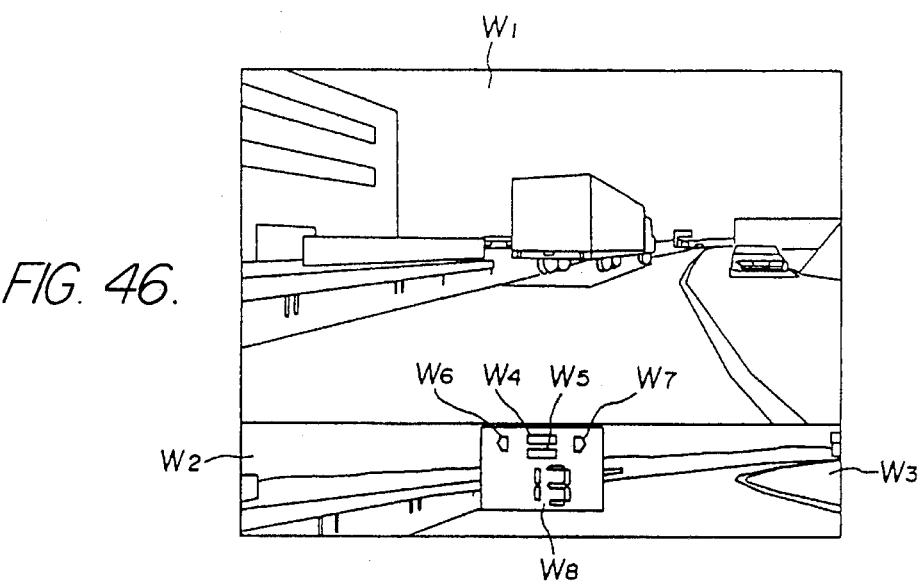
FIG. 46 is a diagram showing a still further example of printout made by the video printer.

More specifically, as shown in FIG. 39, smoothing is performed for the detected signals provided from the lean torque sensor 128 and the steering torque sensor to remove noise contained in those signals. Thereafter, roll gains are determined on the basis of a roll gain table which has been stored in advance. As is apparent also from the figure, roll gains $k_l$ and $k_s$ are determined on the basis of a three-dimensional map using vehicle weight shifts and vehicle speed as parameters.

Then, a rolling angle, $r_1^n$, is calculated as follows:

$$r_1^n = (-t_s^n \cdot k_s^n + t_l^n \cdot k_l^n - h \cdot r_1^{n-1})$$

$t_s^n$: steering torque (handle torque)

$t_l^n$: lean torque $k_s^n$: gain $k_l^n$: gain $0 < h < 1$ (h: rolling stability)

Next, the calculated rolling angle $r_1^n$ is corrected using a simulation vehicle rolling angle table, to determine an actual rolling angle $r^n$, and on the basis of the actual rolling angle thus obtained, the roll shaft 123a is rotated by the motor 123.

A straight type controlling CPU is the host computer 181, which calculates vehicle speed and coordinates in accordance with signals provided from sensors and switches. Thus, the CPUs for drive control are classified into curving type and straight type, and information is inputted to the curving type CPU directly from various sensors, whereby the speed and accuracy of the calculation for controlling the rolling mechanism 123 and the swing mechanism 124 can be enhanced.

Numeral 183 denotes a CPU for environment control. The CPU 183 controls the speakers SP, spotlights L, vibrating motor 175e and fan 189 for the supply of wind, in accordance with the running information fed from the host computer 181 and switch operation signals.

The speakers SP generate running noise such as exhaust noise and braking noise in accordance with the running information. In this case, the relation between a wind striking noise and the engine noise is set in such a manner that the engine noise is louder in a low vehicle speed region, while in a high vehicle speed region, the wind striking noise is louder, as shown in FIG. 40. This is for approaching the actual driving environment more closer. A bank angle of the vehicle body, i.e., a step noise threshold value, in the event of contact of the step with the road surface is set so as to become smaller with increase of the vehicle speed, as shown in FIG. 41. This is because when the vehicle rolls at a high vehicle speed, an increased centrifugal force causes the suspension to sink to a large extent, so even at a small bank angle the step comes into contact with the road surface, and this condition is to be reproduced realistically.

The motor 175e for simulative vibration of the engine is controlled as shown in FIG. 42 in accordance with the running information (engine speed) fed from the CPU 183 for environment control, so that the rider bodily feels engine vibrations through the handle. More particularly, when the self-starting motor is pushed, that is, in an idling state, the number of revolutions of the motor 175e for simulative vibration of the engine becomes large. Thereafter, a control is made so that when the idling is over, the number of revolutions once decreases, and then as the engine speed increases, the number of revolutions of the motor 175e increases. Thus, this setting permits the rider to check the operating state of the engine clearly.

The spotlights L are turned on and off by operating an ignition key switch provided in the simulation vehicle 103. When the key switch is off, the spotlights L are on, while with the key switch on, the spotlights are off. Although this may be effected by the CPU 183 for environment control, a CR circuit may be incorporated in the ignition key switch.

Figure 37:
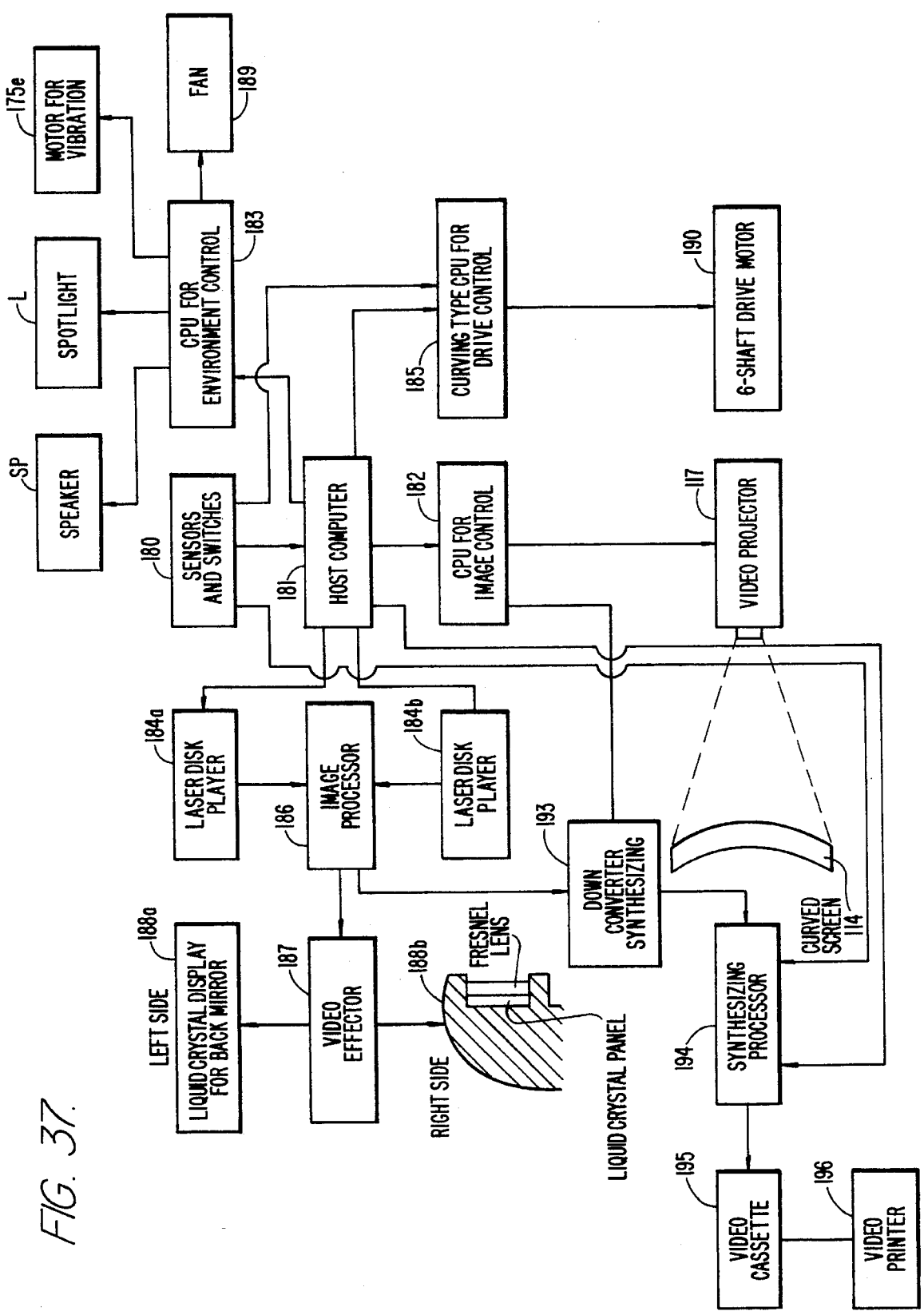
FIG. 37 is a block diagram showing an electrical construction of the fourth embodiment.

In FIG. 37, the numeral 193 denotes a down converter synthesizer, in which an image signal as information to be projected on the curved screen 114 and which is fed from the image controlling CPU 182, and a composite image signal as information to be reflected in the rear view mirrors and which has gone through the synthesizing processing in the image processor 186, are combined together with information laid out in predetermined positions.

Then, the image signal outputted from the down converter synthesizer 193 is fed to a synthesizing processor 194, in which necessary pieces of information such as information as to whether the brakes have been actuated or not which is detected by sensors, the vehicle speed calculated by the host computer 181, etc. are added in the form of signals to provide a composite signal. Through these processings, the image signal as information to be projected on the curved screen 114, the image signal as information to be reflected in the rear view mirrors, as well as information signals indicative of whether the front and rear brakes are in operation or not, etc. are combined and the resulting composite signal is recorded in a video cassette 195.

The information thus recorded in the video cassette 195 is outputted in the form of an image onto a printing paper or an ordinary paper by means of a video printer 196, where required in a predetermined traveling condition. FIGS. 43 to 46 show examples of output from the video printer 196. In each of these figures, an upper image W1 represents an image projected on the curved screen 114; lower images W2 and W3 represent images reflected in the right and left rear view mirrors; central display portions W4 and W5 indicate whether the front and rear brakes are in operation or not; right and left outer display portions W6 and W7 indicate whether a winker is ON or not; a display portion W8 located below indicates the vehicle speed. In this embodiment there are set states in which the rider is startled such as a state (FIG. 46) wherein a parking car is present ahead in a predetermined driving condition and a state (FIG. 44) wherein a crossing car is present, so that a third party can later check the rider's reaction.

The operation of the embodiment constructed as above will now be described. Upon application of power from a main power source to the riding simulation system of the embodiment, the host computer initializes the components of the system and assumes a stand-by state. Then, when a start switch (not shown) is operated, the host computer 181 detects it and supplies a start signal to each of the image controlling CPU 182, drive controlling CPU 185 and environment controlling CPU 183 for the start of operation.

As a result, first, the image controlling CPU 182 starts up the video projector 117 and projects an initial image onto the curved screen 114. The drive controlling CPU 185 starts a servo control for the six-shaft motor which constitutes the moving mechanism portion 102. On the other hand, the environment controlling CPU 183 turns on the spotlights L for lighting of the simulation vehicle 103. In this state, when the rider gets on the vehicle and operates the ignition key for setting to an engine start-up state, the CPU 183 turns off the spotlights L to create an easily visible environment for the screen. At the same time, self-starting motor noise and exhaust noise in engine start-up are generated from the speakers SP.

When the simulation vehicle starts running in response to the rider's operation of the gear change mechanism, clutch and throttle valve, these operations are detected by various sensors and the host computer 181 generates running information in accordance with the detected signals provided from those sensors. Then, in accordance with the running information, the image controlling CPU 182 forms a predetermined running scene on the curved screen 114, and the drive controlling CPU 185 imparts a predetermined running behavior to the simulation vehicle 103. Further, the environment controlling CPU 183 drives the vibrating motor 175e and the fan, thereby imparting a reality feeling to the rider.

In the case where such operations of riding simulation are used for the training of driving a two-wheeled vehicle, the instructor gives instructions for vehicle running to the rider, using a transmitter, which instructions are transmitted to the rider through the headphones incorporated in the rider's helmet. For example, when a course change is to be made in accordance with the instructor's instructions, the rider first makes sure that there is no another vehicle present behind the simulation vehicle on the basis of the image projected on the liquid crystal displays 88a and 88b provided in the rear view mirrors and then performs the course change. In accordance with this course changing operation, the moving mechanism portion 102 imparts a predetermined behavior to the simulation vehicle 103, and the image on the display unit 104 changes with the said operation.

Although in the above embodiment there is used a single curved screen 114, this constitutes no limitation. There may be adopted a dividable construction into plural portions so that the screen can be carried easily. Although the video projector 117 is disposed in a lower position of the display unit 104, it may be disposed in an upper position. Further, although two reflecting mirrors 113 and 115 are provided, no limitation is made thereto; one or three or more reflecting mirrors may be provided.

As set forth above, the display means may be provided with a curved screen having a center on the side where the two-wheeled simulation vehicle is present, and an image projecting device which projects images on the curved screen from behind. In this construction, the images projected on the curved screen from the image projecting device are not intercepted by the simulation vehicle or by the riders and are easily visible to the rider and have reality. Since images reflected by mirrors are projected on the curved screen from behind, the optical path can be long with the source at a short distance from the screen and hence it is possible to attain a compact structure of the system without impairing the function thereof.

An image signal as information to be projected on the curved screen 114 and an image signal as information to be reflected in the rear view mirrors are once combined together in the down converter synthesizer 193, followed by further synthesis in the synthesizing processor 194 in an incorporated state of information signals indicative of whether the front and rear brakes are in operation or not. The resulting composite information signal is recorded in the video cassette and, where required, it is outputted in the form of an image onto a printing paper or the like by means of the video printer 196.

Therefore, when the instructor instructs the rider after driving, it is possible to let the rider recall the driving condition at every moment by showing each image (FIGS. 43 to 46) thus printed out. Besides, it is possible to check whether the rider has performed an appropriate driving operation or not, for example, whether an appropriate braking operation has been performed or not, or whether a winker lamp has been turned on or not. In FIG. 43, there is a bus which is an obstacle when the simulation vehicle turns to the right, and in this case it is possible to check whether the rider has decelerated the vehicle to a sufficient extent or not, or in FIG. 44, a car is crossing ahead of the simulation vehicles and in this case it is possible to check whether appropriate braking has been applied or not.

Although in the above embodiment the information which has been recorded in the video cassette 195 is reproduced onto a printing paper or the like by means of the video printer 196, this does not constitute any limitation. Such information may be reproduced by an electrical processing through video monitoring.

Since the riding simulation system is provided with an image recording means for recording both images displayed by a display means and driving operation data in a combined state, and is also provided with a reproducing means for reproducing the information recorded in the image recording means, such recorded information can be outputted by an output means as necessary after driving the simulation vehicle. Therefore, it is possible for the rider to easily recall the driving condition at every moment; besides, the rider's driving operation at every moment can be reproduced, thus permitting an instructor, for example, to give effective instructions to the rider. Further, since information of images reflected in the back mirrors during simulation is also inputted to the image recording means, it is possible to reproduce not only front information in vehicle running but also rear information obtained from the back mirrors, thus permitting driving instructions which are in closer touch with reality.

What is claimed is:

1. A riding simulation system comprising:

a simulation vehicle to be driven by a driver and having rear view mirrors;

display means disposed in front of said simulation vehicle for displaying images of pre-recorded running scenes observable by the driver;

a mount including drive means for imparting simulative running behaviors to said simulation vehicle;

processor means for controlling said display means and said mount in accordance with driving operations performed by the driver to simulate running conditions;

a backward image generator including:

(a) a first image control which generates first coordinate information indicative of a running position of another vehicle moving on an imaginary traveling map, and extracts second coordinate information indicative of a running position of said simulation vehicle and speed information indicative of a running speed of said simulation vehicle from information generated by said processor means;

(b) a second image control which, on the basis of said first and second coordinate information, generates first frame information designating an image of another vehicle of a size proportional to the distance between said simulation vehicle and said another vehicle, and second frame information designating the course image in the rear view corresponding to said second coordinate information;

(c) a first image producer having stored pre-recorded images of said another vehicle for reproducing an image of said another vehicle selected in accordance with said first frame information out of said pre-recorded images of said another vehicle;

(d) a second image producer having stored pre-recorded course images in the rear view for reproducing, on the basis of said speed information, a course image selected in accordance with said second frame information out of said pre-recorded course images; and (e) an image combining means for combining said output images from said first and second image producers and thereby forming said backward image; and backward image display means provided in said simulation vehicle for displaying, as images, video signals fed from said backward image generator.

* * * * *